(12) United States Patent
Yamaguchi

(10) Patent No.: US 9,174,499 B2
(45) Date of Patent: Nov. 3, 2015

(54) PNEUMATIC TIRE

(75) Inventor: Masashi Yamaguchi, Atsugi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 658 days.

(21) Appl. No.: 12/531,026

(22) PCT Filed: Mar. 12, 2008

(86) PCT No.: PCT/JP2008/054535
§ 371 (c)(1),
(2), (4) Date: Oct. 28, 2009

(87) PCT Pub. No.: WO2008/114668
PCT Pub. Date: Sep. 25, 2008

(65) Prior Publication Data
US 2010/0038001 A1    Feb. 18, 2010

(30) Foreign Application Priority Data

Mar. 12, 2007  (JP) ................... 2007-062640
Mar. 12, 2007  (JP) ................... 2007-062642

(51) Int. Cl.
*B60C 23/18* (2006.01)
*B60C 23/19* (2006.01)
(Continued)

(52) U.S. Cl.
CPC ............. *B60C 13/02* (2013.01); *B60C 11/0309* (2013.04); *B60C 11/042* (2013.04); *B60C 17/0009* (2013.04); *B60C 17/0045* (2013.04); *B60C 2011/1338* (2013.04)

(58) Field of Classification Search
CPC .. B60C 13/02; B60C 13/023; B60C 17/0009; B60C 17/0045

USPC .......................................... 152/153, 523, 524
IPC .............................................. B60C 23/18,23/19
See application file for complete search history.

(56) References Cited

U.S. PATENT DOCUMENTS 2,760,541 A * 8/1956 Reifenberger ................ 152/153
3,270,794 A * 9/1966 Skidmore ..................... 152/153
(Continued)

FOREIGN PATENT DOCUMENTS

CN       1626368 A       6/2005
DE    44 29 796 A1       2/1996
(Continued)

OTHER PUBLICATIONS

English language machine translation of JP08-337104, 1996.*
(Continued)

*Primary Examiner* — Richard Crispino
*Assistant Examiner* — Philip N Schwartz
(74) *Attorney, Agent, or Firm* — Sughrue Mion, PLLC

(57) ABSTRACT

The present invention relates to a pneumatic tire 1 in which turbulent-flow generating projections 10 each extending from an inner circumference side to an outer circumference side are provided on a outer circumferential face 3a which is tire surface of tire side portion 3 at intervals in a tire circumferential direction. Each of the turbulent-flow generating projections 10 includes an edge portion 10g when being viewed in a cross-sectional shape taken along a direction perpendicular to an extending direction thereof, and a front wall angle θ formed between a front wall face 10a of each turbulent-flow generating projection 10 and the tire surface (outer circumferential face 3a) is set in the range of 70° to 110°, the front wall face being hit by an airflow.

14 Claims, 17 Drawing Sheets

(51) Int. Cl.
*B60C 13/02* (2006.01)
*B60C 11/03* (2006.01)
*B60C 11/04* (2006.01)
*B60C 17/00* (2006.01)

(56) References Cited

U.S. PATENT DOCUMENTS

| | | | | |
|---|---|---|---|---|
| 4,198,774 | A | * | 4/1980 | Roberts et al. .................. 40/587 |
| 4,343,342 | A | * | 8/1982 | McDonald .................... 152/523 |
| 5,494,958 | A | * | 2/1996 | Freeman et al. ............. 524/505 |
| 5,679,184 | A | * | 10/1997 | Hosking ....................... 152/157 |
| 2005/0121130 | A1 | * | 6/2005 | Albert et al. .................. 152/544 |
| 2005/0126670 | A1 | | 6/2005 | Godefroid |
| 2007/0006951 | A1 | * | 1/2007 | Summers ...................... 152/153 |

FOREIGN PATENT DOCUMENTS

| | | | | |
|---|---|---|---|---|
| EP | 1 541 383 | A2 | | 6/2005 |
| EP | 1 568 514 | A1 | | 8/2005 |
| GB | 1471883 | | * 4/1977 | ............. B60C 13/00 |
| JP | H01-175507 | A | | 7/1989 |
| JP | 05016265 | A | * 1/1993 | ............. B29D 30/30 |
| JP | 06234309 | A | * 8/1994 | ............. B60C 13/02 |
| JP | 08-337104 | A | | 12/1996 |
| JP | 2003246209 | A | * 9/2003 | ............. B60C 13/00 |
| JP | 3639001 | A | | 1/2005 |
| JP | 2005-231600 | A | | 9/2005 |
| JP | 2006-076431 | A | | 3/2006 |
| JP | 2006-248317 | A | | 9/2006 |
| JP | 2006-248318 | A | | 9/2006 |
| JP | 2006248317 | A | * 9/2006 | ............. B60C 13/02 |
| JP | 2006-341655 | A | | 12/2006 |
| WO | 95/18022 | A1 | | 7/1995 |

OTHER PUBLICATIONS

LaFerre, Steve, Tire Talk—Taking It to the Streets, May 1, 2006.*
English Language Machine Translation of JP2006-248317, 2006.*
English Language Machine Translation of JP2003-246209, 2003.*
English language machine translation of JP06-234309, 1994.*
American Heritage Dictionary online accessed Mar. 16, 2014, definition of "heavy duty".*
Korean Office Action issued in Korean Application No. 10-2009-7019310 dated Apr. 12, 2011.
Chinese Office Action dated Nov. 5, 2010 corresponding to counterpart Chinese Patent Application No. 200880007963.
Supplementary European Search Report issued in European Application No. 08721951.5-2425 / 2141031 dated Jul. 29, 2010 (6 pages).
International Search Report of PCT/JP2008/054535 dated Jun. 10, 2008.
Japanese Office Action dated May 27, 2014, corresponding to Japanese Patent Application No. 2013-191803.

* cited by examiner

TIRE ROTATION DIRECTION (a)

(b)

| PARAMETER | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|
| w (mm) | -- | 2 | 2 | 2 | 2 | 2 |
| $\theta_1$ (°) | -- | 60 | 120 | 70 | 90 | 110 |
| p / h | -- | 12 | 12 | 12 | 12 | 12 |
| (p−w) / w | -- | 5 | 5 | 5 | 5 | 5 |
| h / r$^{1/2}$ (mm$^{1/2}$) | -- | 0.10 | 0.10 | 0.10 | 0.10 | 0.10 |
| DURABILITY | 100 | 105 | 103 | 123 | 135 | 125 |

FIG. 24

| PARAMETER | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|
| w (mm) | – | 2 | 2 | 2 | 2 | 2 |
| $\theta_1$ (°) | – | 90 | 90 | 90 | 90 | 90 |
| p / h | – | 12 | 12 | 12 | 12 | 12 |
| (p–w) / w | – | 1.2 | 89 | 3.6 | 5 | 71 |
| $h / r^{1/2}$ (mm$^{1/2}$) | – | 0.019 | 0.79 | 0.03 | 0.10 | 0.63 |
| DURABILITY | 100 | 100 | 100 | 110 | 135 | 115 |

FIG. 25

| PARAMETER | EXAMPLE 1 | COMPARATIVE EXAMPLE | EXAMPLE 2 |
|---|---|---|---|
| w (mm) | 2 | 2 | 2 |
| $\theta_1$ (°) | 90 | 90 | 90 |
| $\theta_2$ (°) | 90 | 70 | 110 |
| p / h | 12 | 12 | 12 |
| (p–w) / w | 5 | 5 | 5 |
| $h / r^{1/2}$ (mm$^{1/2}$) | 0.10 | 0.10 | 0.10 |
| DURABILITY | 100 | 97 | 110 |

PNEUMATIC TIRE

The present invention relates to a pneumatic tire, particularly, a pneumatic tire capable of decreasing temperature in a tire side portion prone to occurrence of degradation.

BACKGROUND ART

In general, increase of a tire temperature in a pneumatic tire is considered unfavorable in terms of durability since the increase accelerates time-dependent changes such as a change in material property, and leads to breakage of a tread portion and the like when the tire travels at high speed. Decreasing a tire temperature has been a challenge for enhancing durability particularly in the cases of an off-the-road radial tire (ORR) and a truck/bus radial tire (TBR) which are used under heavy loads, and in the case of a run-flat tire when travelling in a punctured state (when travelling with an inflation pressure thereof at 0 kPa).

For example, in a run-flat tire having a sidewall reinforcing layer whose cross-sectional shape in a tread-width direction is crescent, when the tire travels in a punctured state, deformation in a tire radius direction concentrates on the sidewall reinforcing layer, and causes the sidewall reinforcing layer to reach a very high temperature, whereby durability is severely affected.

As other means for decreasing a tire temperature in such a pneumatic tire, particularly, a temperature in a tire side portion, there is disclosed a technology of providing a reinforcing member which reduces distortion of each of constituent members (particularly, a carcass layer located in a sidewall portion, and a bead portion) of the pneumatic tire (Japanese Patent Application Publication No. 2006-76431).

There is also known a pneumatic tire including a rim guard having a large number of ridges arranged thereon as another means for decreasing a tire temperature in a pneumatic tire, the rim guard being disposed outward, in a tread-width direction, of a bead portion which comes in contact with a rim.

However, in the case of a conventional pneumatic tire in which the above described reinforcing member is provided, provision of the reinforcing member increases a tire weight, and leads to occurrence of an unintended additional failure such as separation (detachment) of the reinforcing member. There has been a problem that normal traveling performances such as driving stability and riding comfort are deteriorated thereby. Particularly in the case of a run-flat tire, it has been feared that vertical spring (elasticity in a vertical direction of the tire) when the tire travels with a normal inflation pressure becomes high, and thereby deteriorates normal traveling performances. Therefore, a method for not damaging these normal traveling performances has been demanded.

On the other hand, in the case of the pneumatic tire in which the rim guard is provided, heat release is accelerated by increase of a surface area of the tire. However, efficient heat release of a tire side portion has not been achieved only by the simple increase of the tire surface area since a rubber member with low heat conductivity is arranged in the outer circumferential side of the pneumatic tire.

Therefore, the present invention was made in consideration of the above described situation, and aims to provide a pneumatic tire capable of enhancing durability by decreasing of a tire temperature, specifically a temperature inside a tire side portion, through efficient heat release.

DISCLOSURE OF THE INVENTION

The present invention has the following aspects. First of all, a first aspect of the present invention is summarized as a pneumatic tire in which turbulent-flow generating projections each provided so as to extend from the inner circumferential side to the outer circumferential side are provided on a tire surface at intervals in a tire circumferential direction, the pneumatic tire being summarized in that: each of the turbulent-flow generating projections includes an edge portion when being viewed in a cross-sectional shape taken along a direction perpendicular to an extending direction thereof; and a front wall angle formed between a front wall face of each turbulent-flow generating projection and the tire surface is set in the range of 70° to 110°, the front wall face being hit by an airflow.

According to the feature above, when the pneumatic tire rotates, airflows which flow along substantially in the tire circumferential direction in a manner relative thereto are generated on the tire surface. These airflows carry out active heat exchange with the tire surface by flowing on the tire surface after being turned into turbulent flows by the turbulent-flow generating projections.

In detailed description of flows of the turbulent flows which flow on the tire surface, airflows are turned into upward-and-downward turbulent flows which go upward in positions where the turbulent-flow generating projections exist, and go downward in positions where the turbulent-flow generating projections do not exist. Particularly, in a condition that the turbulent-flow generating projections respectively include the edge portions, separation of the airflows from the tire surface is facilitated when the airflows go over the turbulent-flow generating projections with the rotation of the pneumatic tire. Consequently, the airflows once separated from the tire surface are turned into turbulent flows and can accelerate heat exchange with the tire surface, the turbulent flows rapidly falling onto and hitting the tire surface due to negative pressures generated in rearward sides (downstream) of the respective turbulent-flow generating projections in a direction of the tire rotation.

Additionally, in a condition that the front wall angle θ1 of each of the turbulent-flow generating projections is set in the range of 70° to 110° an angle of air separated in the edge portion can be made large to some extent, and the upward-and-downward turbulent flows turn into strong downward flows in the downstream of the respective turbulent-flow generating projections and hit the tire surface, whereby active heat exchange with the tire surface is carried out. Thus, a tire temperature can be reliably decreased by the turbulent-flow generating projections provided on the tire surface, and durability can be enhanced.

Another aspect of the present invention is summarized as the cross-sectional shape of each turbulent-flow generating projection is left-right symmetric.

According to the feature above, in a condition that a projection-width cross-sectional shape of the turbulent-flow generating projection is left-right symmetric, leftward and rightward distances respectively to both surfaces of the turbulent-flow generating projection from a center position of the turbulent-flow generating projection in a projection-width cross-section thereof are equal, whereby a heat storage amount inside the turbulent-flow generating projection can be reduced to the smallest possible level.

Another aspect of the present invention is summarized as a rear wall angle formed between a rear wall face and the tire surface is set to 90° or more, the rear wall face being located in the rear of the front wall face with respect to a tire rotation direction.

According to the feature above, in a condition that the rear wall angle θ2 of the rear wall face, which has no influence on generation of the upward-and-downward turbulent flow, is set to 90° or more, a rubber thickness of the turbulent-flow generating projection can be gradually reduced in a height direction thereof, whereby, rigidity of the turbulent-flow generating projection is maintained by ensuring a size of a lower side width thereof, and at the same time, a rubber amount of the turbulent-flow generating projection can be reduced while heat storage inside the turbulent-flow generating projection can be reduced.

Another aspect of the present invention is summarized as the cross-sectional shape of the turbulent-flow generating projection is left-right asymmetric.

According to the feature above, in a condition that the cross-sectional shape of the turbulent-flow generating projection is left-right asymmetric, the front wall angle θ1 can be set to the most appropriate angle for generating the turbulent flows, and also, a rubber amount of the turbulent-flow generating projection can be reduced while heat storage inside the turbulent-flow generating projection can be reduced in the rear wall face side.

Another aspect of the present invention is summarized as the lower side width in the cross-sectional shape of the turbulent-flow generating projection is set in the range of 0.5 mm to 5 mm.

According to the feature above, in a condition that the lower side width of the turbulent-flow generating projection is set in the range of 0.5 mm to 5 mm, enhancement of a heat releasing property can be improved while a heat storage amount inside the turbulent-flow generating projection can be prevented as much as possible from increasing excessively.

Another aspect of the present invention is summarized as a relationship of $0.03 \leq h/R^{1/2} \leq 0.64$ is satisfied where: h denotes a height of the turbulent-flow generating projection; and R denotes a tire radius. It is particularly preferable that a relationship of $0.05 \leq h/R^{1/2} \leq 0.64$ be satisfied.

According to feature above, in a condition that a value of $h/R^{1/2}$ is set in the range of $0.03 \leq h/R^{1/2} \leq 0.64$ (particularly, $0.05 \leq h/R^{1/2} \leq 0.64$), the height of the turbulent-flow generating projection can be changeable in accordance with a tire size, whereby, regardless of a tire size, a tire temperature can be reliably decreased and durability can be enhanced.

Another aspect of the present invention is summarized as the cross-sectional shape of the turbulent-flow generating projection is trapezoidal.

According to the feature above, in a condition that the projection-width cross-sectional shape of the turbulent-flow generating projection is trapezoidal, angled portions having an angle of 90° or more are eliminated from the turbulent-flow generating projection, whereby generation of cracks attributable to degradation of angled portions can be prevented as much as possible. Further, rigidity of the turbulent-flow generating projection is maintained by ensuring a size of a lower side width thereof, and at the same time, a rubber amount of the turbulent-flow generating projection can be reduced while heat storage inside the turbulent-flow generating projection can be reduced.

Another aspect of the present invention is summarized as the cross-sectional shape of the turbulent-flow generating projection is triangular.

According to the feature above, in a condition that the projection-width cross-sectional shape of the turbulent-flow generating projection in the is triangular, rigidity of the turbulent-flow generating projection is maintained by securing a size of a lower side width thereof, and, at the same time, a rubber amount of the turbulent-flow generating projection can be reduced while heat storage inside the turbulent-flow generating projection can be reduced.

Another aspect of the present invention is summarized as: the front wall face in the cross-sectional shape of the turbulent-flow generating projection is a flat face; and a rear wall face in the cross-sectional shape of the turbulent-flow generating projection is an arc face, the rear wall face being located in the rear of the front wall face with respect to a tire rotation direction.

According to the feature above, in a condition that the rear wall face in the projection-width cross-sectional shape of the turbulent-flow generating projection is an arc face, the downstream of the turbulent-flow generating projection becomes a negative pressure region, and, although a vortex flow is generated therein, this vortex flow can be smoothly returned to the main stream by the arc face.

Another aspect of the present invention is summarized as the cross-sectional shape of the turbulent-flow generating projection is a stepped shape having a step.

According to the feature above, in a condition that the projection-width cross-sectional shape of the turbulent-flow generating projection is stepped, rigidity of the turbulent-flow generating projection can be maintained by securing a size of the lower side width, and at the same time, a rubber amount of the turbulent-flow generating projection can be reduced while heat storage inside the turbulent-flow generating projection can be reduced.

Another aspect of the present invention is summarized as a through-hole penetrating in a direction perpendicular to the extending direction is formed in the turbulent-flow generating projection.

According to the feature above, in a condition that the through-hole is formed in the turbulent-flow generating projection, an airflow flows into the through-hole, whereby heat can be released from inside the turbulent-flow generating projection. Accordingly, heat storage inside the turbulent-flow generating projection can be further reduced.

Another feature of the present invention is summarized as relationships of $1.0 \leq p/h \leq 50.0$ and $1.0 \leq (p-w)/w \leq 100.0$ are satisfied where: h denotes the height of each of the turbulent-flow generating projections; p denotes a pitch of adjacent ones of the turbulent-flow generating projections in the tire rotation direction; and w denotes the lower side width of each of the turbulent-flow generating projections in the cross-sectional shape.

According to the feature above, in a condition that a (p−w)/w value is set in the range of $1.0 \leq (p-w)/w \leq 100.0$ at the same time as a p/h value is set in the range of $1.0 \leq p/h \leq 50.0$, a heat storage amount inside the turbulent-flow generating projection can be reduced to the smallest possible level while active heat exchange with the tire surface can be carried out in positions where the turbulent-flow generating projections do not exist.

Another feature of the present invention is summarized as a tilt angle θ is set in the range of $-70° \leq \theta \leq 70°$, the tilt angle θ being an angle at which each of the turbulent-flow generating projections is tilted to a tire radial direction.

According to the feature above, in a condition that the tilt angle θ of the turbulent-flow generating projection is set in the range of $-70° \leq \theta \leq 70°$, the airflows generated by the rotation of the pneumatic tire in a manner relative thereto reliably hit the front wall faces of the turbulent-flow generating projections, whereby a heat releasing effect attributable to the above described turbulent flows can be expected.

Another feature of the present invention is summarized as the turbulent-flow generating projections are provided in a tire side portion.

According to the feature above, in a condition that the turbulent-flow generating projections are provided in a tire side portion, active heat exchange with the tire side portion can be carried out, whereby a tire temperature in the tire side portion can be reliably decreased.

Another feature of the present invention is summarized as a sidewall reinforcing layer which reinforces the tire side portion is provided in the tire side portion.

According to the feature above, in a condition that the sidewall reinforcing layer is provided in the tire side portion, tire temperatures can be reliably decreased in portions (for example, the outer side of the sidewall reinforcing layer in a punctured state) considered as those suffering from sharp temperature increases attributable to deflections thereof, and durability can be enhanced.

Another feature of the present invention is summarized in being a heavy-duty tire.

According to the feature above, in a condition that the pneumatic tire is a heavy-duty tire, even in a case where a speed of a vehicle on which the heavy-duty tire is mounted is low (for example, at 10 to 50 km/h), active heat exchange with the tire side portion can be caused, whereby a tire temperature in the tire side portion can be reliably decreased.

Another feature of the present invention is summarized in that each of the turbulent-flow generating projections is provided in a groove formed in a tread portion.

According to the feature above, in a condition that the turbulent-flow generating projection is provided in a groove formed in the tread portion, active heat exchange with the groove formed in the tread portion can be carried out, whereby a tire temperature in the tire side portion can be reliably decreased.

BRIEF DESCRIPTION OF THE DRAWINGS

FIG. 24 is a table showing a relationship between durability and heights and radiuses of the turbulent-flow generating projections in the examples.

FIG. 25 is a table showing a relationship between durability and rear wall angles of the turbulent-flow generating projections in the examples.

BEST MODE FOR CARRYING OUT THE INVENTION

First Embodiment

Figure 1:
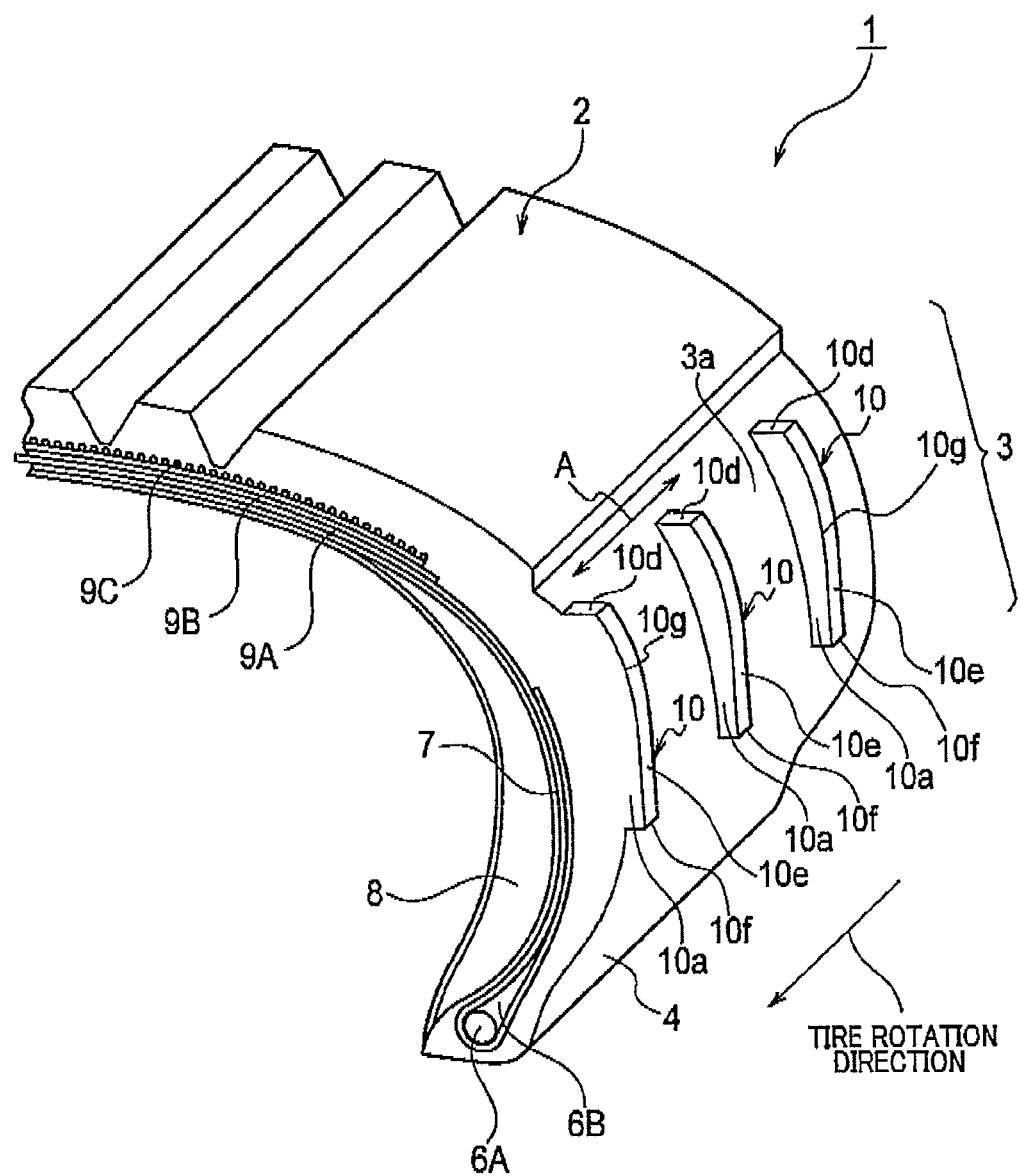
FIG. 1 is an exploded perspective view showing a part of a pneumatic tire according to a first embodiment.

Next, one example of the pneumatic tire according to the present invention will be described with reference to the drawings. Note that, in the following description of the drawings, the same or similar parts will be denoted by the same or similar reference numerals. However, it should be noted that, since the drawings are schematic, dimensional proportions and the like are different from actual ones. Accordingly, specific dimensions and the like should be judged in consideration of the following description. Additionally, it goes without saying that there are some parts having dimensional relationships and dimensional proportions different from one drawing to another.

(Configuration of Pneumatic Tire)

Figure 2:
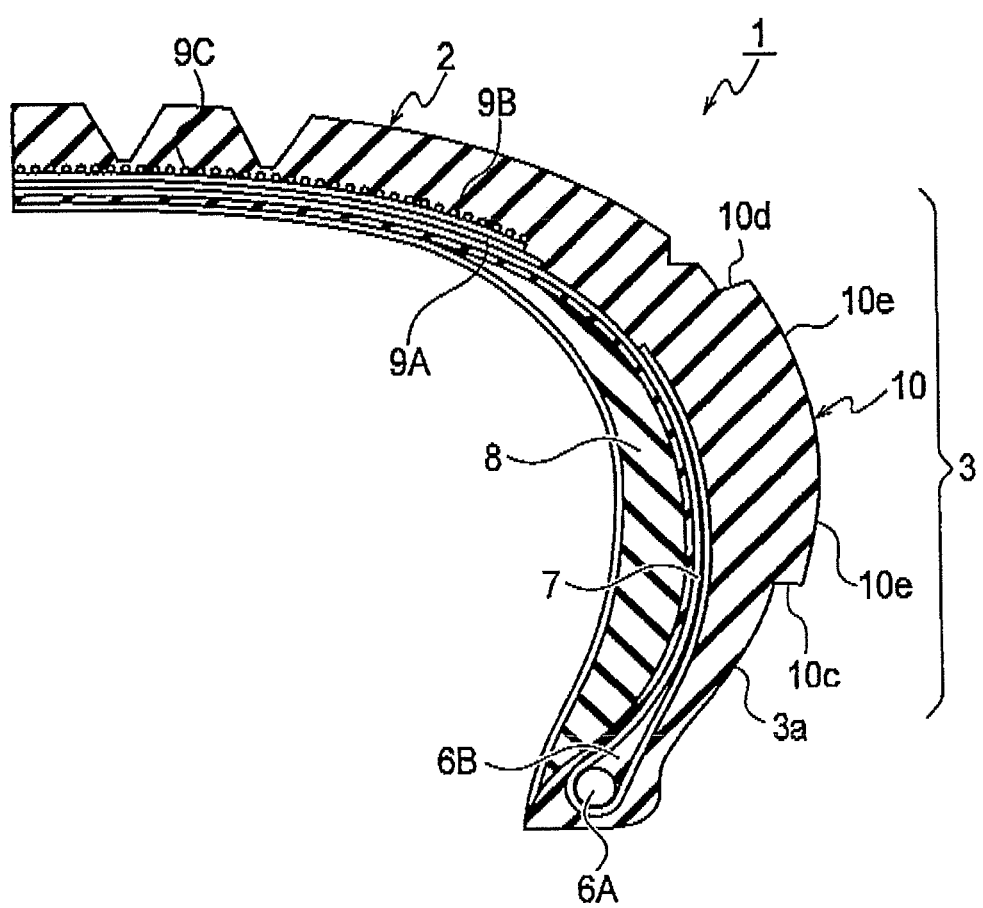
FIG. 2 is a tread-width direction cross-sectional view showing the pneumatic tire according to the first embodiment.

Firstly, configurations of a pneumatic tire according to a first embodiment will be described with reference to FIGS. 1 and 2. FIG. 1 is an exploded perspective view showing a part of the pneumatic tire according to the first embodiment; FIG. 2, a tread-width direction cross-sectional view showing the pneumatic tire according to the first embodiment; and FIG. 3, a partial side view showing the pneumatic tire according to the first embodiment. Note that the pneumatic tire 1 is assumed to be a passenger car radial tire (PCR).

As shown in FIGS. 1 and 2, the pneumatic tire 1 includes: a tread portion 2 that contacts a road surface; tire side portions 3 on the both sides of the tire; and bead portions 4 provided along open edges of the respective tire side portions 3.

Note that the tire side portion 3 indicates a portion from an end portion, in a tread-width direction, of the tread portion 2 which contacts the road surface to an outer side, in a tire radial direction, of a bead portion 4 which contacts a rim (not shown).

Each of the bead portions 4 includes a bead core 6A and a bead filler 6B which circle along a marginal portion of an opening portion of corresponding one of the tire side portions 3. Steel cord or the like is used for this bead core 6A.

A carcass layer 7 forming the framework of the tire is provided to the inner side of the tread portion 2, the paired tire side portions 3 and the paired bead portions 4. A sidewall reinforcing layer 8 which reinforces each of the tire side portions 3 is provided to the inner side (the inner side in a tire width direction) of a portion of the carcass layer 7 located in each of the tire side portions 3. This sidewall reinforcing layer 8 is formed of a rubber stock whose cross-sectional shape in a tread-width direction is crescent.

Plural belt layers (steel-belt reinforcing layers 9A and 9B and a circumferential-direction reinforcing layer 9C) are provided in a portion located to the inner circumferential side of the tread portion 2 and to the outer circumferential side of the carcass layer 7 (that is, a portion between the tread portion 2 and the carcass layer 7). Note that, while the inner circumferential side means the inner side in a tire radial direction, the outer circumferential side means the outer side in the tire radial direction.

Figure 3:
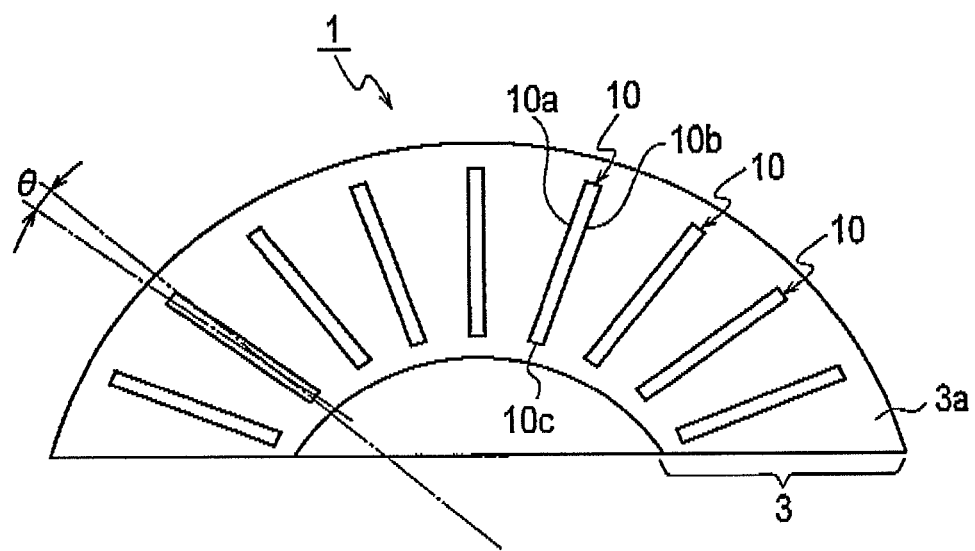
FIG. 3 is a partial side view showing the pneumatic tire according to the first embodiment.

On an outer circumferential face 3a which is a tire surface of each of the tire side portions 3, turbulent-flow generating projections 10 each extending from the inner circumferential side to the outer circumferential face 3a are provided at regular intervals in a tire circumferential direction. A tilt angle θ that is an angle at which each of the turbulent-flow generating projections tilts to the tire radial direction is set in the range of −70°≤θ≥70° as shown in FIG. 3. It is particularly preferable that the tilt angle θ be set in the range of −30°≤θ≥30°.

Since the pneumatic tire 1 is a rotating body, airflows passing by the outer circumferential face 3a of the tire side portion 3 move from the inner circumferential side toward the outer circumferential side along with rotation and centrifugal force of the pneumatic tire 1. That is, in order that heat exchange with the outer circumferential face 3a may be accelerated in the downstream of the respective turbulent-flow generating projections 10 (between adjacent ones of the turbulent-flow generating projections 10), it is preferable that the tilt angle θ of each of the turbulent-flow generating projection 10 be set in the above range.

(Configuration of Turbulent-flow Generating Projection)

Figure 4:
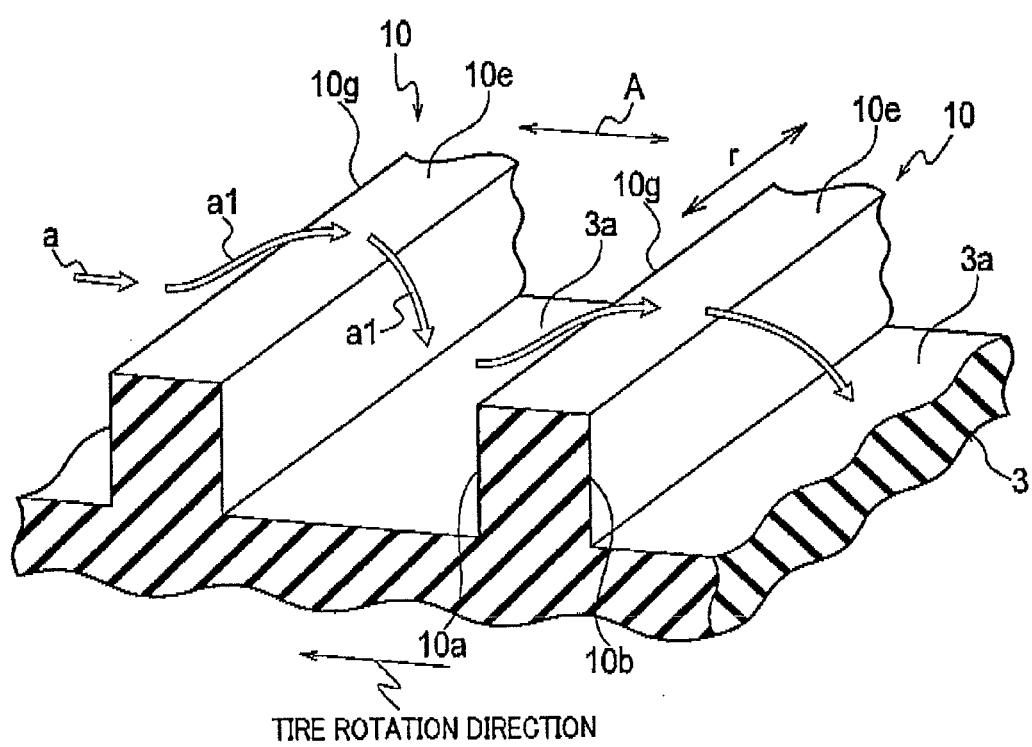
FIG. 4 is a perspective view showing parts of turbulent-flow generating projections according to the first embodiment.
Figure 5:
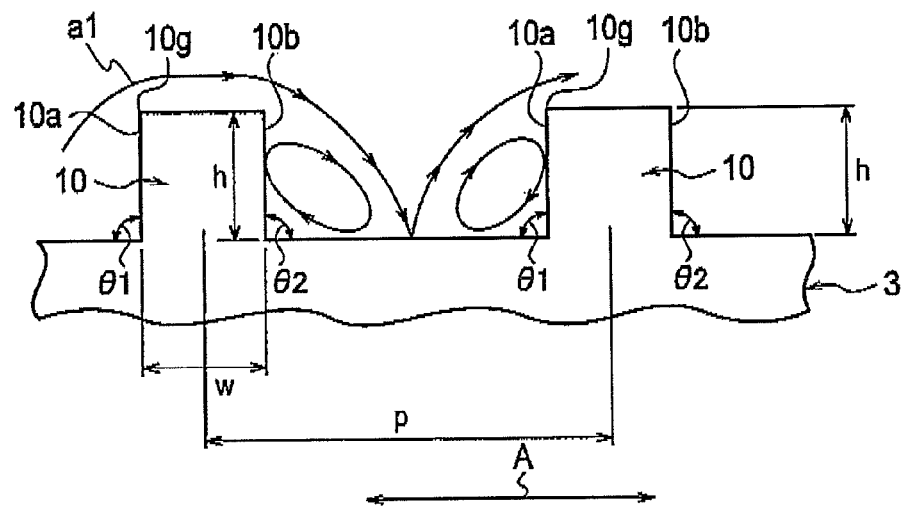
FIG. 5 is a side view showing cross-sections of the turbulent-flow generating projections according to the first embodiment (Part I).

Next, configurations of each of the above described turbulent-flow generating projections 10 will be described with reference to FIGS. 4 and 5. FIG. 4 is a perspective view showing parts of the turbulent-flow generating projections according to the first embodiment. FIG. 5 is a side view showing cross-sections of the turbulent-flow generating projections according to the first embodiment.

As shown in FIGS. 4 and 5, a cross-sectional shape (hereinafter, projection-width cross-sectional shape) of each of the turbulent-flow generating projections 10 is left-right symmetric, the cross-sectional shape being taken along a direction A perpendicular to an extending direction thereof. This turbulent-flow generating projection 10 projects outward from the outer side face 3a in the tread-width direction, and extends continuously (in a rod-like shape) from the inner side in the tire radial direction toward the outer side in the tire radial direction.

Specifically, the turbulent-flow generating projection 10 includes: a front wall face 10a located in the front in a tire rotation direction (that is, a side hit by an airflow generated by rotation of the pneumatic tire 1); a rear wall face 10b located in the rear of the front wall face 10a with respect to the tire rotation direction; an inner side face 10c located in the inner side in the tire radial direction; an outer side face 10d located in the outer side in the tire radial direction; and an upper face 10e projecting the most from the outer circumferential face 3a.

This turbulent-flow generating projection 10 includes an edge portion 10f when being viewed in a cross-section in the tread-width direction (refer to FIGS. 1 and 3). That is, the edge portion 10f is formed between the inner side face 10c and the upper face 10e of the turbulent-flow generating projection 10.

Additionally, the turbulent-flow generating projection 10 includes another edge portion 10g when being viewed in a cross-section thereof (hereinafter, a projection-width cross section) taken along the direction A perpendicular to the extending direction. That is, the edge portion 10g is formed between the front wall face 10a and the upper face 10e of the turbulent-flow generating projection 10.

Although it is preferable that the edge portions 10f and 10g are sharply pointed, the edge portions 10f and 10g are not necessarily required to be sharply pointed and may be rounded for the convenience of manufacturing. Needless to say, previously subtly rounded ones may be included.

A front wall angle θ1 formed between the front wall face 10a of the turbulent-flow generating projection and the outer circumferential face 3a (the tire surface) is set in the range of 70° to 110°.

Note that, if the front wall angle θ1 is less than 70°, a flow of air thrown up above after hitting the front wall face 10a becomes small, and an angle β (refer to FIG. 6) of air separated at the edge portion 10g becomes small, whereby only a gentle downward flow is generated in the downstream of the turbulent-flow generating projection 10. On the other hand, if the front wall angle θ1 exceeds 110°, the angle β of air separated at the edge portion 10g becomes small, and a flow rate of air thrown up above after hitting the front wall face 10a becomes low, whereby heat exchange with the outer circumferential side 3a cannot be promoted.

Figure 6:
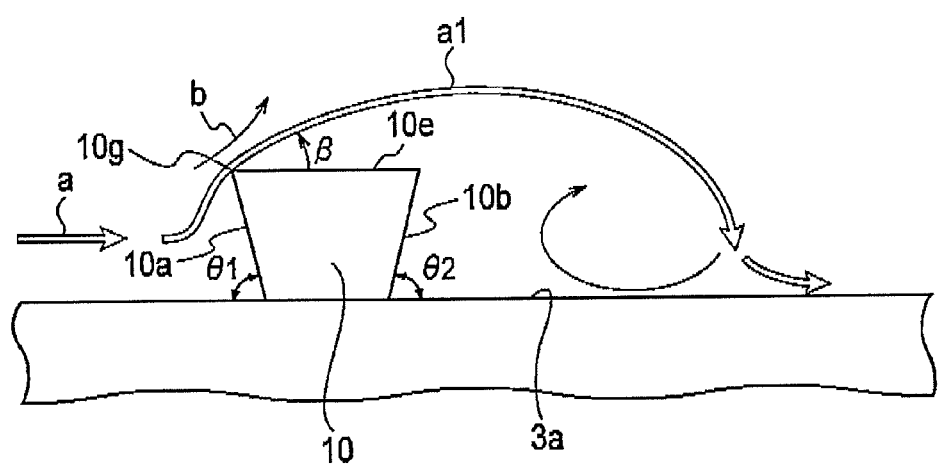
FIG. 6 is a side view showing a cross-section of each of the turbulent-flow generating projections according to the first embodiment (Part II).

Here, in the first embodiment, the projection-width cross-sectional shape of the turbulent-flow generating projection 10 is quadrangular, and the front wall angle θ1 is set to 90°. That is, since the projection-width cross-sectional shape of the turbulent-flow generating projection 10 is left-right asymmetric, a rear wall angle θ2 formed between the outer circumferential face 3a (the tire surface) and the rear wall face 10b located in the rear of the front wall face 10a with respect to the tire rotation direction is set to the same angle (90°) as the front wall angle θ1. Needless to say, the front wall angle θ1 and the rear wall angle θ2 may both be an angle smaller than 90° as shown in FIG. 6.

A lower side width (a width that is perpendicular to the extending direction and is the closest to the outer circumferential face 3a) w in the projection-width cross-sectional shape of the turbulent-flow generating projection 10 is set in the range of 0.5 to 5 mm.

Note that, if the lower side width w of the turbulent-flow generating projection 10 is less than 0.5 mm, the turbulent-flow generating projection 10 is caused to vibrate by an airflow, and thereby becomes weak in strength in some cases. On the other hand, if the lower side width w of the turbulent-flow generating projection 10 exceeds 5 mm, a heat storage amount inside the turbulent-flow generating projection 10 (a heat storage amount in a projection base portion of the turbulent-flow generating projection 10) excessively increases in some cases.

Here, the configurations (the lower side width w described above, and a height h, a tire radius R, a pitch p and the like which will be described later) of each of the turbulent-flow generating projections 10 are all described uniformly in millimeters (mm).

Additionally, considering that the height h (the largest height from the outer circumferential face 3a to the most projected position of the turbulent-flow generating projection) of the turbulent-flow generating projection 10 is set in accordance with a tire size, it is preferable that a relationship of $0.03 \leq h/R^{1/2} \leq 0.64$ be satisfied where: h denotes the height of the turbulent-flow generating projection 10; and R denotes the tire radius. It is particularly preferable that a value of $h/R^{1/2}$ be set in the range of $0.05 \leq h/R^{1/2} \leq 0.64$.

Not that, if the value of $h/R^{1/2}$ is smaller than 0.03, the turbulent-flow generating projection 10 is buried in a layer of low-speed airflow, and therefore cannot sufficiently take in a high-speed airflow flowing over the low-speed airflow, whereby active heat exchange cannot be expected. On the other hand, if the value of $h/R^{1/2}$ exceeds 0.64, the height of the turbulent-flow generating projection 10 is too high, and a heat storage amount inside the turbulent-flow generating projection 10 excessively increases in some cases.

Additionally, it is preferable that relationships of $1.0 \leq p/h \leq 50.0$ and $1.0 \leq (p-w)/w \leq 100.0$ be concurrently satisfied where: h denotes the height of each of the turbulent-flow generating projections 10; p denotes a pitch between adjacent ones of the turbulent-flow generating projections 10 (a distance between points each halving the width, perpendicular to the extending directions, of the turbulent-flow generating projection 10) in the tire rotation direction; and w denotes the lower side width of each of the turbulent-flow generating projections 10. It is particularly preferable that a value of p/h be set in the range of $10.0 \leq p/h \leq 20.0$. Additionally, it is preferable that a value of (p−w)/w be set in the range of $4.0 \leq (p-w)/w \leq 39.0$.

Note that, if the p/h value is smaller than 1.0, an airflow does not hit the outer circumferential face 3a between the adjacent ones of the turbulent-flow generating projections 10, and tire temperatures cannot be efficiently decreased in some cases. On the other hand, if the value of p/h is larger than 50.0, speed of an airflow slows down between the adjacent ones of the turbulent-flow generating projections 10, and only the same effect as in a case where no shapes of the turbulent-flow generating projections 11 are formed is brought about in some cases.

Additionally, if the value of (p−w)/w is smaller than 1.0, a surface area of the turbulent-flow generating projection 10 becomes equal to or larger than an area from which heat has to be released, and tire temperatures cannot be efficiently decreased in some cases. On the other hand, if the value of (p−w)/w is greater than 100.0, the speed of an airflow slows down between the adjacent ones of the turbulent-flow generating projections 10, and only the same effect as in a case where no shapes of the turbulent-flow generating projections 11 are formed is brought about in some cases.

(Functions and Effects According to First Embodiment)

In the above described configurations, as the pneumatic tire 1 rotates, an airflow a flowing along substantially in the tire circumferential direction in a manner relative thereto is generated on the outer circumferential face 3a of the tire side portion 3 as shown in FIGS. 4 and 5. By flowing on the outer circumferential face 3a after being turned into a turbulent flow by one of the turbulent-flow generating projections 10, this airflow a carries out active heat exchange with this outer circumferential face 3a.

In detailed description of a flow of the turbulent flow flowing on the outer circumferential face 3a, the airflow is turned into an upward-and-downward turbulent flow which goes upward in a position where the turbulent-flow generating projection 10 exists, and goes downward in a position where the turbulent-flow generating projection 10 does not exist.

Particularly, in a condition that each of the turbulent-flow generating projections 10 includes the edge portion 10f, a function of separating an airflow is effected, the airflow being caused, by centrifugal force, to flow from the inner circumferential side to the outer circumferential side with rotation of the pneumatic tire 1. This separated airflow can accelerate heat exchange by hitting the tire side portion 3 after turning into a strong downward flow.

Additionally, in a condition that each of the turbulent-flow generating projections 10 includes the edge portion 10g, it is made easier for an airflow to be separated from the tire side portion 3 when the airflow goes over the turbulent-flow generating projections 10 with rotation of the pneumatic tire 1. Consequently, the airflow once separated from the tire side portion 3 can accelerate heat exchange with the tire side portion 3 by being turned into a turbulent flow by a negative pressure generated in the rearward side (downstream) of the turbulent-flow generating projection 10 in the tire rotation direction, the turbulent flow rapidly falling onto and hitting the tire side portion 3.

Additionally, in a condition that the front wall angle θ of each of the turbulent-flow generating projections 10 is set in the range of 70° to 110°, an angle β of air separated at the edge portion 10g in the upward-and-downward turbulent flow a1 can be made large to some extent, and the upward-and-downward turbulent flow a1 hits the outer circumferential face 3a after turning into a strong downward flow in the downstream of the turbulent-flow generating projection 10, whereby active heat exchange with the tire surface is carried out. Thus, decrease of tire temperature can be reliably facilitated by the turbulent-flow generating projections 10 provided on the outer circumferential face 3a, and durability can be enhanced.

Additionally, in a condition that the projection-width cross-sectional shape of each of the turbulent-flow generating projections 10 is left-right symmetric, leftward and rightward distances respectively to both surfaces of the turbulent-flow generating projection 10 from a center position of the turbulent-flow generating projection 10 in the projection-width cross-section thereof are equal, whereby a heat storage amount inside the turbulent-flow generating projection 10 can be reduced to the smallest possible level.

Additionally, in a condition that the lower side width w of each of the turbulent-flow generating projections 10 is set in the range of 0.5 to 5 mm, enhancement of a heat releasing property can be improved while a heat storage amount inside the turbulent-flow generating projection 10 can be prevented as much as possible from excessively increasing.

Additionally, in a condition that the value of $h/R^{1/2}$ is set in the range of $0.03 \leq h/R^{1/2} \leq 0.64$ (particularly, $0.05 \leq h/R^{1/2} \leq 0.64$), the height h of each of the turbulent-flow generating projections 10 can be changeable in accordance with a tire size, whereby, regardless of a tire size, tire temperatures can be reliably decreased and durability can be enhanced.

Additionally, in a condition that the (p−w)/w value is set in the range of $1.0 \leq (p-w)/w \leq 100.0$ (particularly, $4.0 \leq (p-w)/w \leq 39.0$) at the same time as the p/h value is set in the range of 1.0≤p/h≤50.0 (particularly, 10.0≤p/h≤20.0), a heat storage amount inside each of the turbulent-flow generating projections 10 can be reduced to the smallest possible level while active heat exchange with the outer circumferential face 3a can be carried out in positions where the turbulent-flow generating projections 10 do not exist.

Additionally, in a condition that the tilt angle θ of each of the turbulent-flow generating projections 10 is set in the range of −70°≤θ≤70° (particularly, −30°≤θ≤30°), the airflow a generated by the rotation of the pneumatic tire 1 in a manner relative thereto reliably hits the front wall face 10a of the turbulent-flow generating projection 10, whereby a heat releasing effect attributable to the above described turbulent flow can be expected.

Additionally, in a condition that the turbulent-flow generating projections 10 are provided on the tire side portions 3, active heat exchange with the tire side portions 3 can be carried out, and a tire temperature in the tire side portions 3 can be reliably decreased.

Additionally, in a condition that the turbulent-flow generating projections 10 are provided on the tire side portions 3 as well as the sidewall reinforcing layers 8 are provided, tire temperatures can be reliably decreased in portions (for example, the outer sides of the sidewall reinforcing layers in a punctured state) considered as those suffering from sharp temperature increases attributable to deflections thereof, and durability can be enhanced.

Modification Examples a of Turbulent-Flow Generating Projections

Next, the turbulent-flow generating projection 10 according to the above described first embodiment may be modified in the following manners although having been described on the assumption that the projection-width cross-sectional shape of each of the turbulent-flow generating projections 10 is quadrangular.

Modification Example 1

Figure 7:
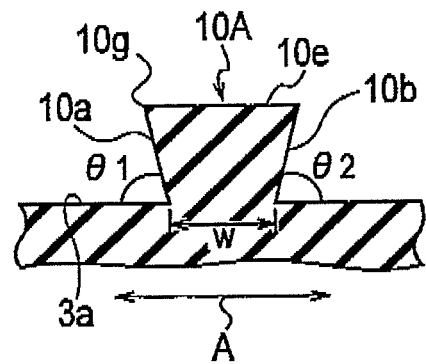
FIG. 7 is a side view showing a cross-section of a turbulent-flow generating projection 10A according to a modification example 1.

Firstly, each turbulent-flow generating projection according to a modification example 1 will be described with reference to FIG. 7. FIG. 7 is a side view showing a cross-section of the turbulent-flow generating projection 10A according to the modification example 1.

As shown in FIG. 7, a projection-width cross-sectional shape of the turbulent-flow generating projection 10A is left-right symmetric. The projection-width cross-sectional shape of this turbulent-flow generating projection 10A is trapezoidal. Additionally, the front wall angle θ1 and the rear wall angle θ2 are both set to an angle exceeding 90°.

In a condition that the projection-width cross-sectional shape of the turbulent-flow generating projection 10A is thus trapezoidal, generation of cracks attributable to degradation of angled portions can be prevented as much as possible since angled portions having an angle exceeding 90° are eliminated from the turbulent-flow generating projection 10A. Additionally, rigidity of the turbulent-flow generating projection 10A is maintained by ensuring a size of the lower side width w, and at the same time, a rubber amount of the turbulent-flow generating projection 10A can be reduced while heat storage inside the turbulent-flow generating projection 10A can be reduced.

Modification Example 2

Figure 8:
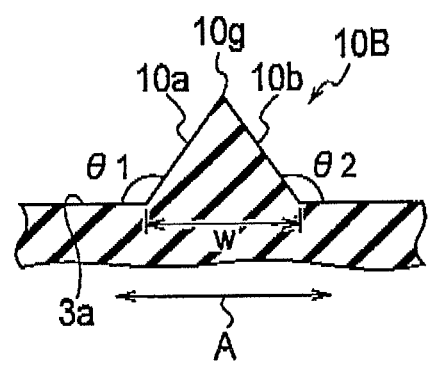
FIG. 8 is a side view showing a cross-section of a turbulent-flow generating projection 10B according to a modification example 2.

Next, each, turbulent-flow generating projection according to a modification example 2 will be described with reference to FIG. 8. FIG. 8 is a side view showing a cross-section of the turbulent-flow generating projection 10B according to the modification example 2.

As shown in FIG. 8, a projection-width cross-sectional shape of the turbulent-flow generating projection 10B is left-right symmetric. The projection-width cross-sectional shape of this turbulent-flow generating projection 10B is triangular. In other words, the front wall angle θ1 and the rear wall angle θ2 are both set to an angle exceeding 90°.

Specifically, the turbulent-flow generating projection 10B is constituted of the front wall face 10a, the rear wall face 10b, the inner side face 10c and the outer side face 10d, and does not include the upper face 10e. That is, the edge portion 10g is formed between the front wall face 10a and the rear wall face 10b of the turbulent-flow generating projection 10B.

In a condition that the projection-width cross-sectional shape of the turbulent-flow generating projection 10B is thus triangular, rigidity of the turbulent-flow generating projection 10B is maintained by ensuring a size of the lower side width w, and at the same time, a rubber amount of the turbulent-flow generating projection 10B can be reduced while heat storage inside the turbulent-flow generating projection 10B can be reduced.

Modification Example 3

Figure 9:
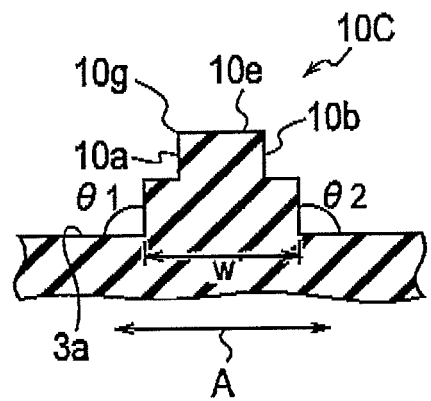
FIG. 9 is a side view showing a cross-section of a turbulent-flow generating projection 10C according to a modification example 3.

Next, each turbulent-flow generating projection according to a modification example 3 will be described with reference to FIG. 9. FIG. 9 is a side view showing a cross-section of the turbulent-flow generating projection 10C according to the modification example 3.

As shown in FIG. 9, a projection-width cross-sectional shape of the turbulent-flow generating projection 10C is left-right symmetric. The projection-width cross-sectional shape of this turbulent-flow generating projection 10C is a stepped shape (a crank shape) having steps. That is, a stepped face having a step is applied to each of the front wall face 10a and the rear wall face 10b. Additionally, the front wall angle θ1 and the rear wall angle θ2 are both set to 90°.

In a condition that the projection-width cross-sectional shape of the turbulent-flow generating projection 10C is thus stepped, rigidity of the turbulent-flow generating projection 10C is maintained by ensuring a size of the lower side width w, and at the same time, a rubber amount of the turbulent-flow generating projection 10C can be reduced while heat storage inside the turbulent-flow generating projection 10C can be reduced.

Modification Example 4

Figure 10:
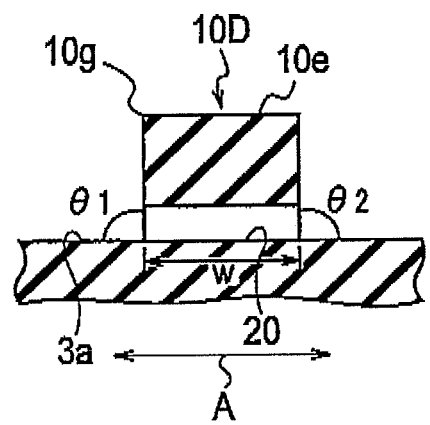
FIG. 10 is a side view showing a cross-section of a turbulent-flow generating projection 10B according to a modification example 4.

Next, each turbulent-flow generating projection according to a modification example 4 will be described with reference to FIG. 10. FIG. 10 is a side view showing a cross-section of the turbulent-flow generating projection 10D according to the modification example 4.

As shown in FIG. 10, a projection-width cross-sectional shape of the turbulent-flow generating projection 10D is left-right symmetric. The projection-width cross-sectional shape of this turbulent-flow generating projection 10D is quadrangular. Additionally, the front wall angle θ1 and the rear wall angle θ2 are both set to 90°.

Additionally, in the turbulent-flow generating projection 10D, a through-hole 20 penetrating in a direction perpendicular to an extending direction thereof is formed. Note that the through-hole 20 is not necessarily required to penetrate the turbulent-flow generating projection 10D in the direction perpendicular to the extending direction, and may penetrate the turbulent-flow generating projection 10D, for example, while being tilted to the extending direction.

In a condition that the through-hole 20 is formed in the turbulent-flow generating projection 10D, an airflow flows into the through-hole 20, and can release heat from inside the turbulent-flow generating projection 10D. Accordingly, heat storage inside the turbulent-flow generating projection 10D can be further reduced.

Modification Examples B of Turbulent-flow Generating Projections

Next, the turbulent-flow generating projections 11 according to the above described first embodiment and modification examples A may be modified in the following manners although having been described on the assumption that the projection-width cross-sectional shape of each of the turbulent-flow generating projections 10 is left-right symmetric.

Modification Example 5

Figure 11:
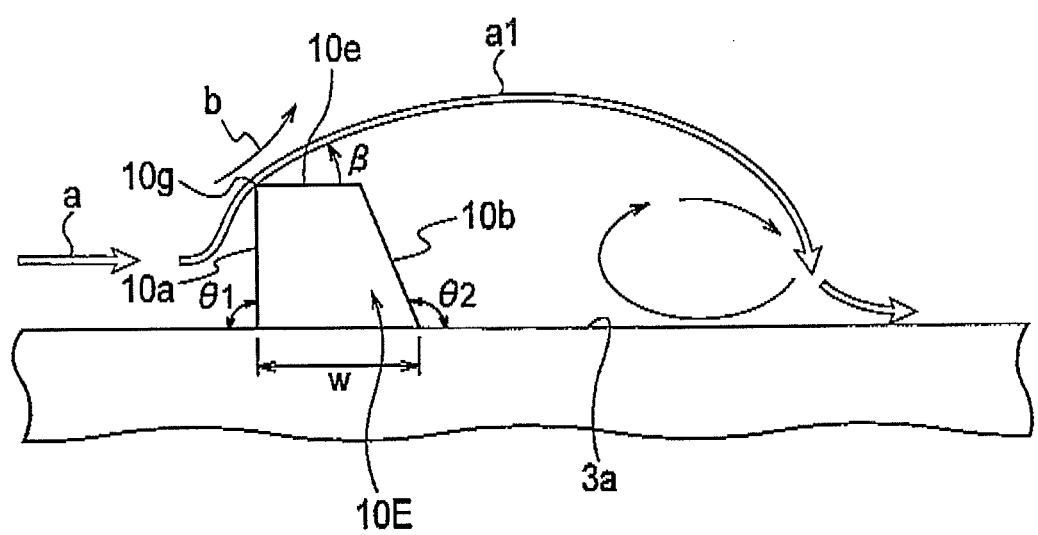
FIG. 11 is a side view showing a cross-section of a turbulent-flow generating projection 10E according to a modification example 5.

Firstly, each turbulent-flow generating projection according to a modification example 5 will be described with reference to FIG. 11. FIG. 11 is a side view showing a cross-section of the turbulent-flow generating projection 10E according to the modification example 5.

As shown in FIG. 11, a projection-width cross-sectional shape of the turbulent-flow generating projection 10E is left-right asymmetric. Even in this case, the turbulent-flow generating projection 10E includes the edge portion 10f and the edge portion 10g (refer to FIGS. 1 and 3).

The projection-width cross-sectional shape of the turbulent-flow generating projection 10E is trapezoidal. Additionally, the front wall angle θ1 is set to 90° and the rear wall angle θ2 is set to an angle exceeding 90°.

In a condition that the projection-width cross-sectional shape of the turbulent-flow generating projection 10E is thus left-right asymmetric, the front wall angle θ1 can be set to an angle that is the most appropriate for generating a turbulent flow, and also, a rubber amount of the turbulent-flow generating projection can be reduced while heat storage inside the turbulent-flow generating projection 10E can be reduced in the rear wall face 10b side.

Additionally, in a condition that the rear wall angle θ2 of the rear wall face 10b, which has no influence on generation of the upward-and-downward turbulent flow a1, is set to an angle exceeding 90°, a rubber thickness of the turbulent-flow generating projection 10E can be gradually reduced in a height direction thereof, whereby, rigidity of the turbulent-flow generating projection 10E is maintained by ensuring a size of the lower side width w, and at the same time, a rubber amount of the turbulent-flow generating projection 10E can be reduced while heat storage inside the turbulent-flow generating projection 10E can be reduced.

Modification Example 6

Figure 12:
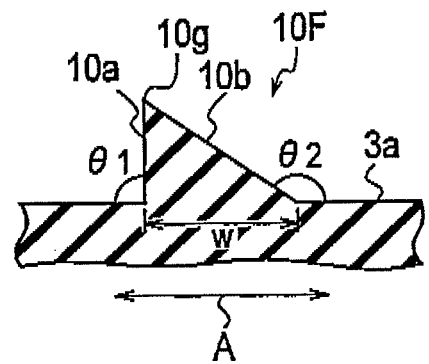
FIG. 12 is a side view showing a cross-section of a turbulent-flow generating projection 10F according to a modification example 6.

Next, each turbulent-flow generating projection according to a modification example 6 will be described with reference to FIG. 12. FIG. 12 is a side view showing a cross-section of the turbulent-flow generating projection 10F according to the modification example 6.

As shown in FIG. 12, a projection-width cross-sectional shape of the turbulent-flow generating projection 10F is left-right asymmetric. The projection-width cross-sectional shape of this turbulent-flow generating projection 10F is triangular. Additionally, the front wall angle θ1 is set to 90°. Additionally, the rear wall angle θ2 is set to an angle far exceeding 90°.

Specifically, the turbulent-flow generating projection 10F is constituted of the front wall face 10a, the rear wall face 10b, the inner side face 10c and the outer side face 10d, and does not include the upper face 10e. That is, the edge portion 10g is formed between the front wall face 10a and the rear wall face 10b of the turbulent-flow generating projection 10F.

In a condition that the rear wall angle θ2 of the rear wall face 10b having no influence on generation of the upward-and-downward turbulent flow a1 is set to an angle exceeding 90° at the same time as the projection-width cross-sectional shape is triangular, rigidity of the turbulent-flow generating projection 10F is maintained by ensuring a size of the lower side width w, and at the same time, a rubber amount of the turbulent-flow generating projection 10F can be reduced while heat storage inside the turbulent-flow generating projection 10F can be reduced.

Modification Example 7

Figure 13:
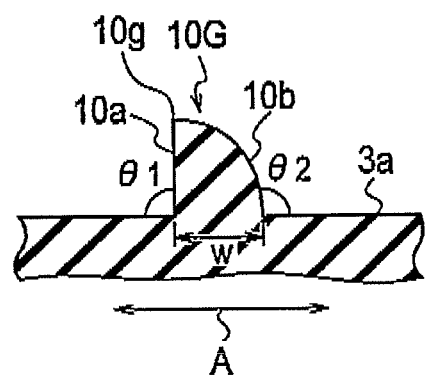
FIG. 13 is a side view showing a cross-section of a turbulent-flow generating projection 10G according to a modification example 7.

Next, each turbulent-flow generating projection according to a modification example 7 will be described with reference to FIG. 13. FIG. 13 is a side view showing a cross-section of the turbulent-flow generating projection 10G according to the modification example 7.

As shown in FIG. 13, a projection-width cross-sectional shape of the turbulent-flow generating projection 10G is left-right asymmetric. The projection-width cross-sectional shape of this turbulent-flow generating projection 10G is roughly triangular.

Specifically, the front wall face 10a in the projection-width cross-sectional shape of the turbulent-flow generating projection 10G is a flat face. Additionally, the rear wall face 10b in the projection-width cross-sectional shape of the turbulent-flow generating projection 10G is an arc face. That is, the front wall angle θ1 is set to 90°. Additionally, the rear wall angle θ2 is set to an angle curving from 90°.

Specifically, the turbulent-flow generating projection 10G is constituted of the front wall face 10a, the rear wall face 10b, the inner side face 10c and the outer side face 10d, and does not include the upper face 10e. That is, the edge portion 10g is formed by the front wall face 10a and the rear wall face 10b of the turbulent-flow generating projection 10G.

In a condition that the rear wall angle θ2 of the rear wall face 10b having no influence on generation of the upward-and-downward turbulent flow a1 is set to an angle exceeding 90° at the same time as the projection-width cross-sectional shape is roughly triangular, rigidity of the turbulent-flow generating projection 10G is maintained by ensuring a size of the lower side width w, and at the same time, a rubber amount of the turbulent-flow generating projection 10G can be reduced while heat storage inside the turbulent-flow generating projection 10G can be reduced.

Additionally, in a condition that the rear wall face 10b in the projection-width cross-sectional shape is an arc face, the downstream of the turbulent-flow generating projection 10G becomes a negative pressure region. Although a vortex flow is generated therein, this vortex flow can be smoothly returned to the main stream by the arc face.

Modification Example 8

Figure 14:
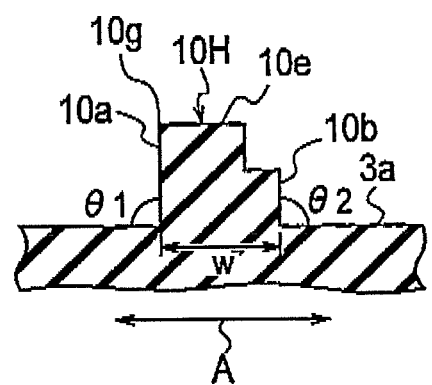
FIG. 14 is a side view showing a cross-section of a turbulent-flow generating projection 10H according to a modification example 8.

Next, each turbulent-flow generating projection according to a modification example 8 will be described with reference to FIG. 14. FIG. 14 is a side view showing a cross-section of the turbulent-flow generating projection 10H according to the modification example 8.

As shown in FIG. 14, a projection-width cross-sectional shape of the turbulent-flow generating projection 10H is left-right asymmetric. This projection-width cross-sectional shape of the turbulent-flow generating projection 10H is a stepped shape (a crank shape) having a step. That is, a stepped face having a step is applied to the rear wall face 10b. Note that the front wall angle θ1 and the rear wall angle θ2 are both set to 90°.

In a condition that, thus, the rear wall angle θ2 of the rear wall face 10b having no influence on generation of the upward-and-downward turbulent flow a1 is set to an angle exceeding 90° while the projection-width cross-sectional shape of the turbulent-flow generating projection 10H is stepped, rigidity of the turbulent-flow generating projection 10H is maintained by ensuring a size of the lower side width w, and at the same time, a rubber amount of the turbulent-flow generating projection 10H can be reduced while heat storage inside the turbulent-flow generating projection 10H can be reduced.

Modification Example 9

Figure 15:
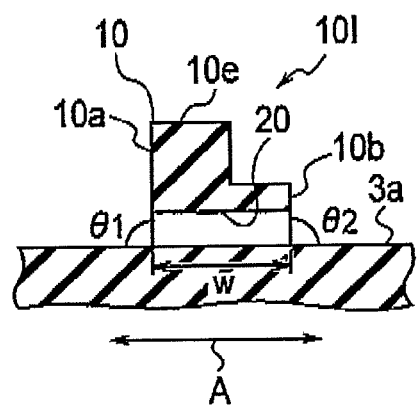
FIG. 15 is a side view showing a cross-section of a turbulent-flow generating projection 10I according to a modification example 9.

Next, each turbulent-flow generating projection according to a modification example 9 will be described with reference to FIG. 15. FIG. 15 is a side view showing a cross-section of the turbulent-flow generating projection 10I according to the modification example 9.

As shown in FIG. 15, a projection-width cross-sectional shape of the turbulent-flow generating projection 10I is left-right asymmetric. The projection-width cross-sectional shape of this turbulent-flow generating projection 10I is a stepped shape (a crank shape) having a step. Note that a stepped face having a step is applied to the rear wall face 10b.

Additionally, in the turbulent-flow generating projection 10I, the through-hole 20 penetrating in a direction perpendicular to an extending direction thereof is formed. Note that the through-hole 20 is not necessarily required to penetrate the turbulent-flow generating projection 10f in the direction perpendicular to the extending direction, and may penetrate the turbulent-flow generating projection 10f, for example, while being tilted to the extending direction.

In a condition that, thus, the through-hole 20 is formed in the turbulent-flow generating projection 10I while the projection-width cross-sectional shape of the turbulent-flow generating projection 10H is stepped, not only the above described functions and effects of the modification example 8 are obtained, but also an airflow flows into the through-hole 20, and can release heat from inside the turbulent-flow generating projection 10I. Accordingly, heat storage inside the turbulent-flow generating projection 10I can be further reduced.

Second Embodiment

Figure 16:
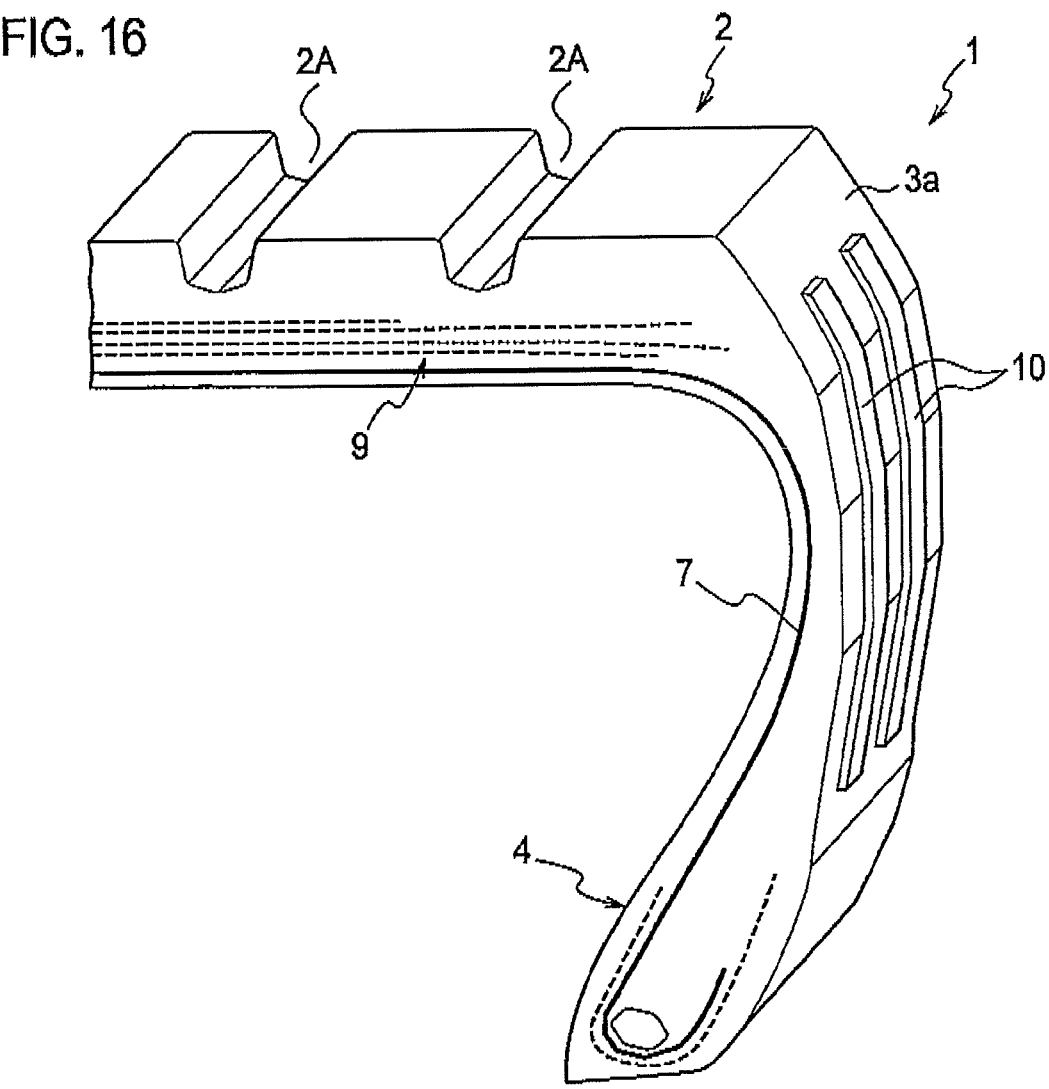
FIG. 16 is a partial exploded perspective view showing a pneumatic tire according to a second embodiment (Part I).

Next, configurations of a pneumatic tire according to a second embodiment will be described with reference to FIG. 16. FIG. 16 is a partial exploded perspective view showing the pneumatic tire according to the second embodiment. Note that parts different from those of the pneumatic tire 1 according to the above described first embodiment will be mainly described with the same reference numerals being used for the same parts (the same configurations) as those of the pneumatic tire 1.

As shown in FIG. 16, the pneumatic tire 1 is a truck/bus radial tire (TBR) in which ribs 2A are formed in the tread portion 2. This pneumatic tire 1 has a larger number of the belt layers 9 and has a larger tire radius than the passenger-car radial tire (PCR) described in the first embodiment.

The turbulent-flow generating projections 10 formed on the pneumatic tire 1 may be arranged inward in the tire radius direction from a widest-width position of the tire (that is, the bead portion 4 side) in a case where heat is required to be released from a surface of the bead portion 4, or may be arranged outward in the tire radius direction from the widest-width position of the tire (that is, the tread portion 2 side) in a case where heat is required to be released from the end portion sides of the belt layers 9.

Figure 17:
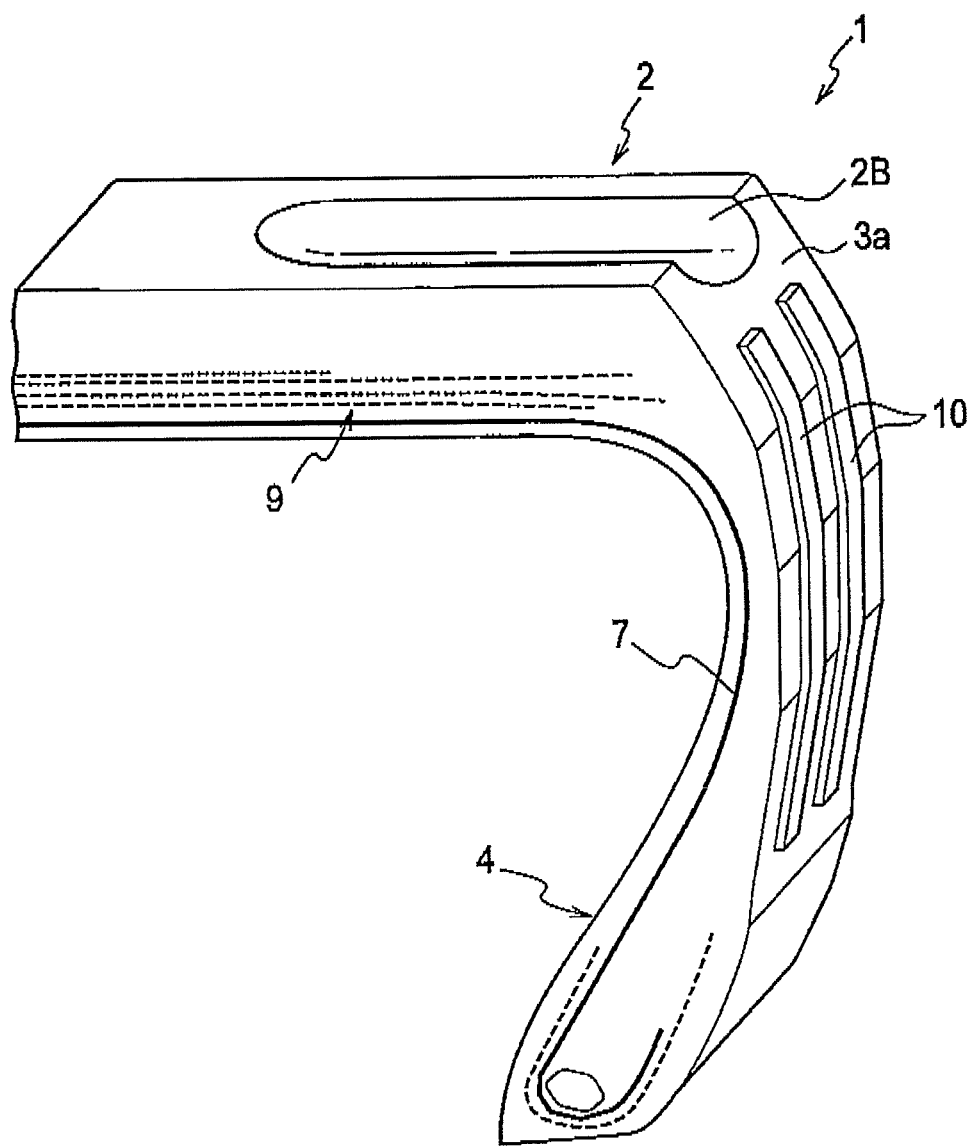
FIG. 17 is a partial exploded perspective view showing the pneumatic tire according to the second embodiment (Part II).
Figure 18:
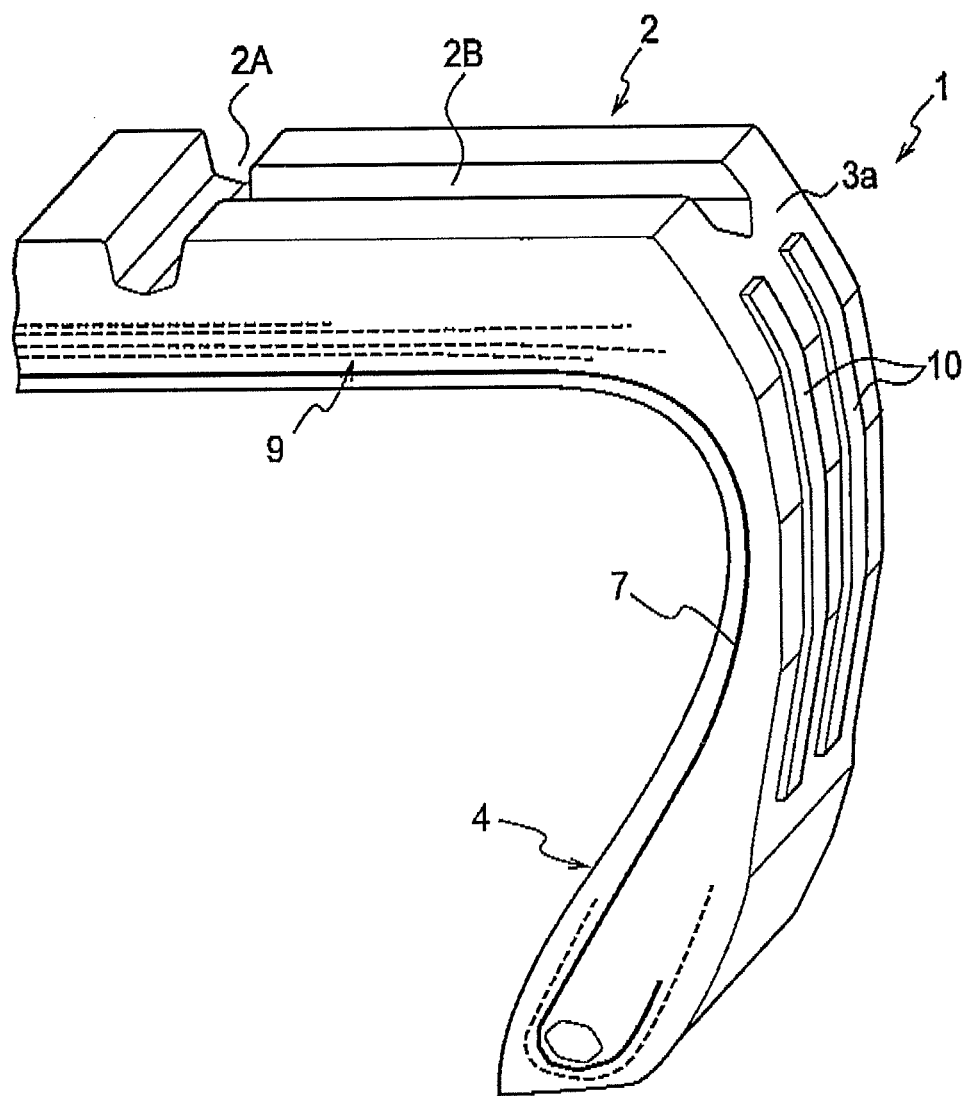
FIG. 18 is a partial exploded perspective view showing the pneumatic tire according to the second embodiment (Part III).

Here, the pneumatic tire 1: should not be limited to the passenger-car radial tire (PCR) described in the first embodiment or to the truck/bus radial tire (TBR) described in this embodiment, and may be a heavy-duty tire such as, for example, a construction vehicle radial tire (a grader, a shovel loader or the like) having only lugs 2B formed in the tread portion 2 as shown in FIG. 17, or another construction vehicle radial tire (a dump truck, a crane or the like) having the ribs 2A and the lugs 2B formed in the tread portion 2 as shown in FIG. 18; and is not necessarily required to be a radial tire, and obviously, may be a bias tire.

(Functions and Effects According to Second Embodiment)

According to the pneumatic tire 1 according to the above described second embodiment, even in a case where a speed of a vehicle on which the heavy-duty tire is mounted is low (for example, at 10 to 50 km/h), active heat exchange with the tire outer side face 3a can be carried out, whereby a tire temperature can be decreased.

Third Embodiment

Figure 19:
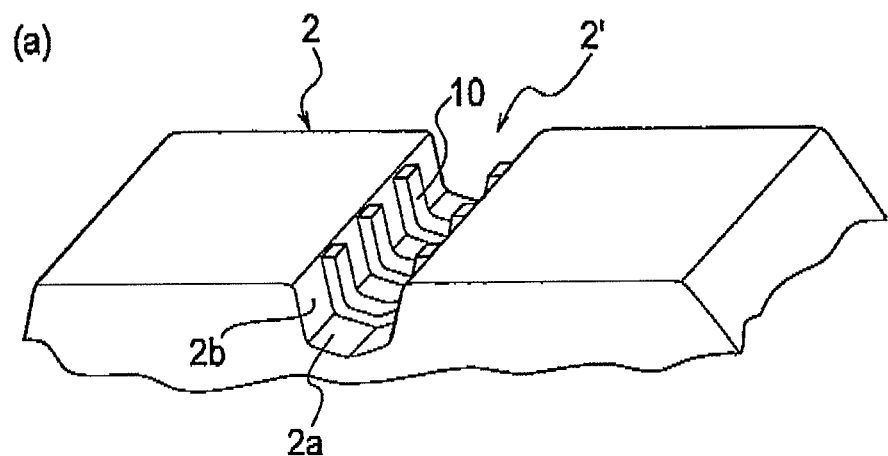
FIG. 19 is a view showing a tread portion of a pneumatic tire according to a third embodiment in a partially enlarged perspective fashion and in a cross-sectional fashion (Part I).
Figure 19:
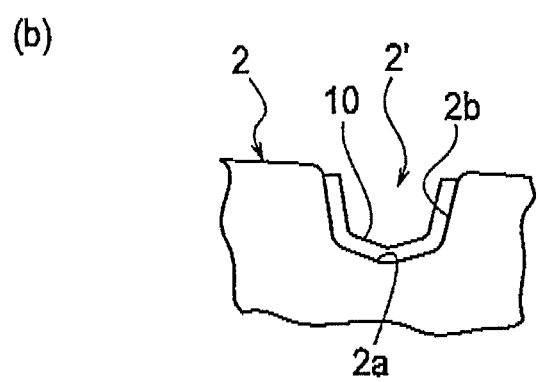

Next, configurations of a pneumatic tire according to a third embodiment will be described with reference to FIG. 19. FIG. 19(a) is a partially enlarged perspective view showing a tread portion of the pneumatic tire according to the third embodiment. FIG. 19(b) is a cross-sectional view of the neighborhood of a groove of the pneumatic tire according to the third embodiment. Note that parts different from the pneumatic tire 1 according to the above described first embodiment will be mainly described with the same reference numerals being used for the same parts as those of the pneumatic tire 1.

As shown in FIGS. 19(a) and 19(b), in a groove 2' formed in the tread portion 2, plural ones of the turbulent-flow generating projections 10 configured to generate turbulent flows by projecting from a tire surface (inside the groove 2') are provided. Note that the groove 2' incorporates each of the ribs 2A or lugs 2B having been described in the second embodiment.

Figure 20:
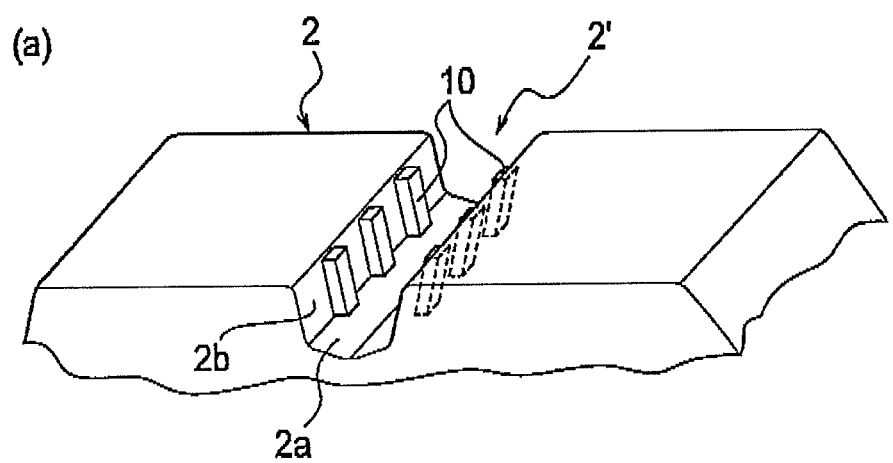
FIG. 20 is a view showing a tread portion of a pneumatic tire according to a third embodiment in a partially enlarged perspective fashion and in a cross-sectional fashion (Part II).
Figure 20:
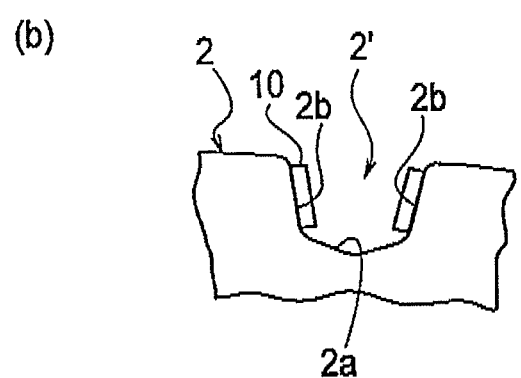
Figure 21:
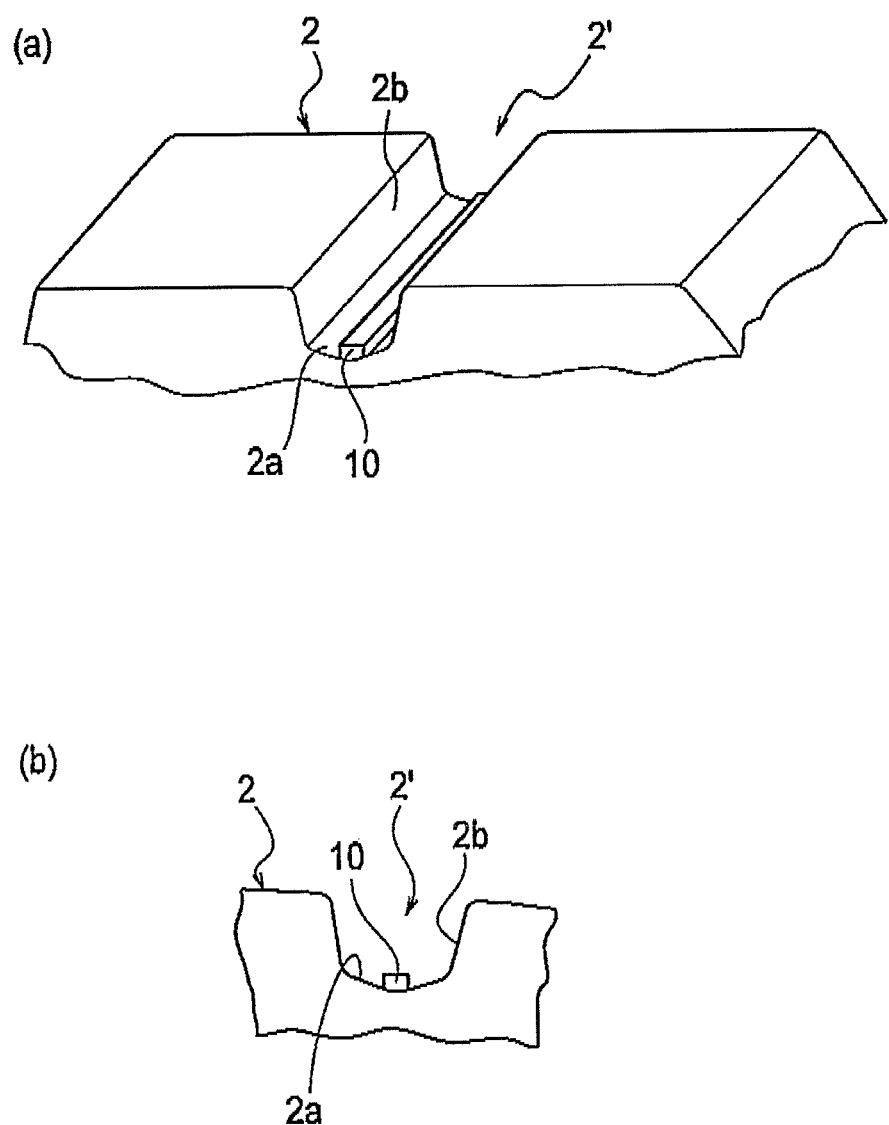
FIG. 21 is a view showing a tread portion of a pneumatic tire according to a third embodiment in a partially enlarged perspective fashion and in a cross-sectional fashion (Part III).

Each of these turbulent-flow generating projections 10 is provided continuously from a bottom face 2a to side faces 2b of the groove 2'. Note that the turbulent-flow generating projection 10 is not necessarily required to be provided from the bottom face 2a to the side faces 2b of the groove 2', and, for example, may be provided only on at least any one of the side faces 2b of the groove 2' as shown in FIG. 20 or may be provided only on the bottom face 2a of the groove 2' as shown in FIG. 21.

(Functions and Effects According to Third Embodiment)

According to the pneumatic tire 1 according to the above described third embodiment, by being provided in the grooves 2', the turbulent-flow generating projections 10 can carry out active heat exchange with the grooves 2' formed in the tread portion, and can decrease a tire temperature in the tread portion 2.

Other Embodiments

Although contents of the present invention have been disclosed through the embodiments of the present invention as has been described above, it should not be understood that any descriptions and drawings which constitute parts of this disclosure limit the present invention.

Specifically, although having been described as being provided all over an entire circumference of each of the tire side portions 3, the turbulent-flow generating projections 10 are not limited to this, and may be provided in a partial region on the tire side portion 3.

Additionally, although having been described as being provided at regular intervals on the tire side portion 3 in a tire circumferential direction, the turbulent-flow generating projections 10 are not limited to this, and may be provided at irregular intervals in the tire circumferential direction.

Figures 22, 23:
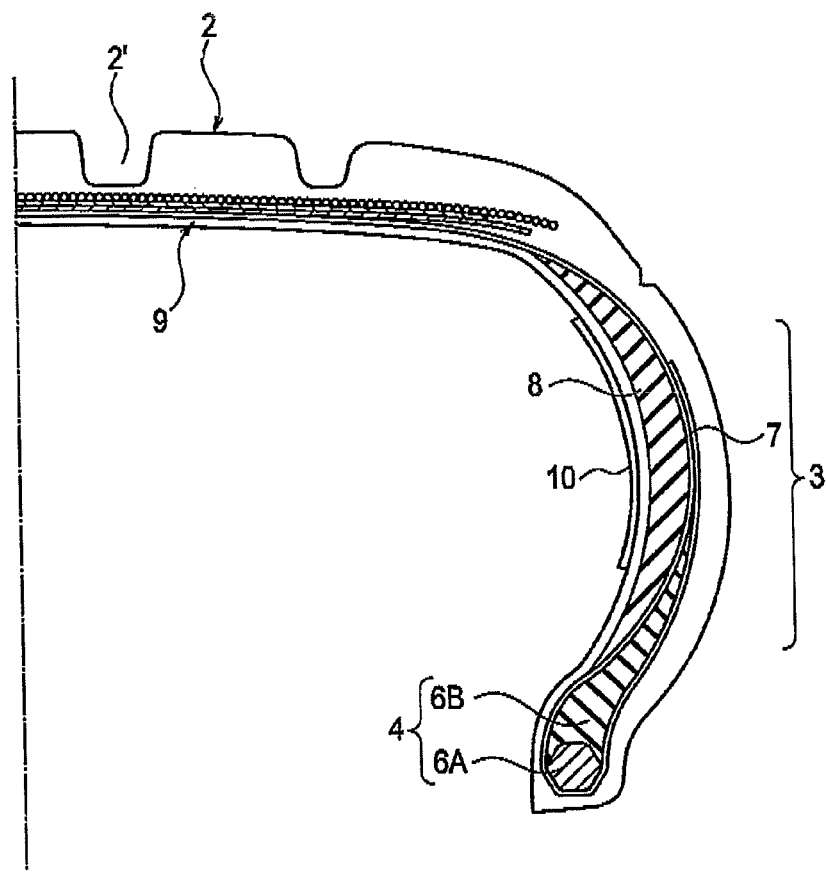
FIG. 22 is a tread-width direction cross-sectional view showing a pneumatic tire according to another embodiment.
FIG. 23 is a table showing a relationship between durability and front wall angles of turbulent-flow generating projections in examples.

Furthermore, although having been described as being provided on the outer circumferential face 3a of the tire side portion 3, the turbulent-flow generating projections 10 are not limited to this, and may be provided on an inner circumferential face of the tire side portion 3 (on a so-called inner liner which is the innermost face of the pneumatic tire 1) as shown in FIG. 22. In this case, the turbulent-flow generating projections 10 project inward from the inner circumferential face in a tread-width direction.

Various alternative embodiments, examples and operational techniques will be apparent to those skilled in the art from this disclosure. Accordingly, the technical scope of the present invention is only defined by the specific subject matters of the invention according to the scope of the invention as defined by the appended claims appropriate for this disclosure.

EXAMPLES

Next, examples will be described. In each of the examples and comparative examples, durability drum tests were conducted under the following conditions. Note that data on each pneumatic tire were measured under the following conditions.
Tire size: 225/55R18
Wheel size: 8.5JJ×18
Inflation pressure condition: 0 kPa
Loading condition: 6.57 kN
Speed condition: 80 km/h
Definitions of p/h, (p−w)/w, θ and the like are as described above.

Firstly, durability of pneumatic tires respectively with different front wall angles θ1 of turbulent-flow generating projections will be described with reference to FIG. 23. As shown in FIG. 23, a pneumatic tire according to Comparative Example 1 had no turbulent-flow generating projections provided thereto. Pneumatic tires according to Comparative Examples 2 and 3 and Examples 1, 2 and 3 had turbulent-flow generating projections each having the same configurations as the above described first embodiment. The front wall angles θ1 were different among these pneumatic tires according to Comparative Examples 2 and 3 and Examples 1, 2 and 3.

A result (a durability evaluation) of each durability drum test was indexed based on a durability distance traveled until a breakdown occurs. From FIG. 23, it is found that durability is enhanced if the front wall angle θ1 is set in the range of 70° to 110°.

Next, disability of pneumatic tires respectively with different values of (p−w)/w and $h/R^{1/2}$ of the turbulent-flow generating projections will be described with reference to FIG. 24. As shown in FIG. 24, the pneumatic tire according to Comparative Example 1 had no turbulent-flow generating projections provided thereto. Pneumatic tires according to Comparative Examples 2 and 3 and Examples 1, 2 and 3 had turbulent-flow generating projections each having the same configurations as the above described embodiment. In these pneumatic tires according to Comparative Examples 2 and 3 and Examples 1, 2 and 3, while p/h=12, values of (p−w)/w were different from one another and so were values of $h/R^{1/2}$.

As in the case of the above described durability drum test, a result (a durability evaluation) of each durability drum test was indexed based on a durability distance traveled until a breakdown occurs. From FIG. 24, it is found that durability is enhanced if $h/R^{1/2}$ is set in the range of $0.03 \leq h/R^{1/2} \leq 0.64$ at the same time as (p−w)/w is set in the range of $1.0 \leq (p-w)/w \leq 100.0$.

Next, durability of pneumatic tires respectively with different rear wall angles θ2 of turbulent-flow generating projections will be described with reference to FIG. 25. As shown in FIG. 25, pneumatic tires according to Comparative example and Example 1 had turbulent-flow generating projections each having the same configurations as the above described embodiment. In these pneumatic tires according to Comparative Example and Examples 1 and 2, the front wall angles θ1 of the turbulent-flow generating projections were set to 90°, and the rear wall angles θ2 were different from one another.

As in the case of the above described durability test, a result (a durability evaluation) of each durability drum test was indexed based on a durability distance traveled until a breakdown occurs. From FIG. 25, it is found that, if the rear wall angle θ2 of the turbulent-flow generating projections is set in the range of 90° to 110°, durability is enhanced as compared to a case where the rear wall angle θ2 is set to an angle less than 90°.

Finally, heat conductivity improvement indices in relation to $h/R^{1/2}$ when p/h=12 will be described with reference to FIG. 26. Note that the heat conduction improvement indices are set up with the index of a pneumatic tire having no turbulent-flow generating projections provided thereto being set to 100.

Figure 26:
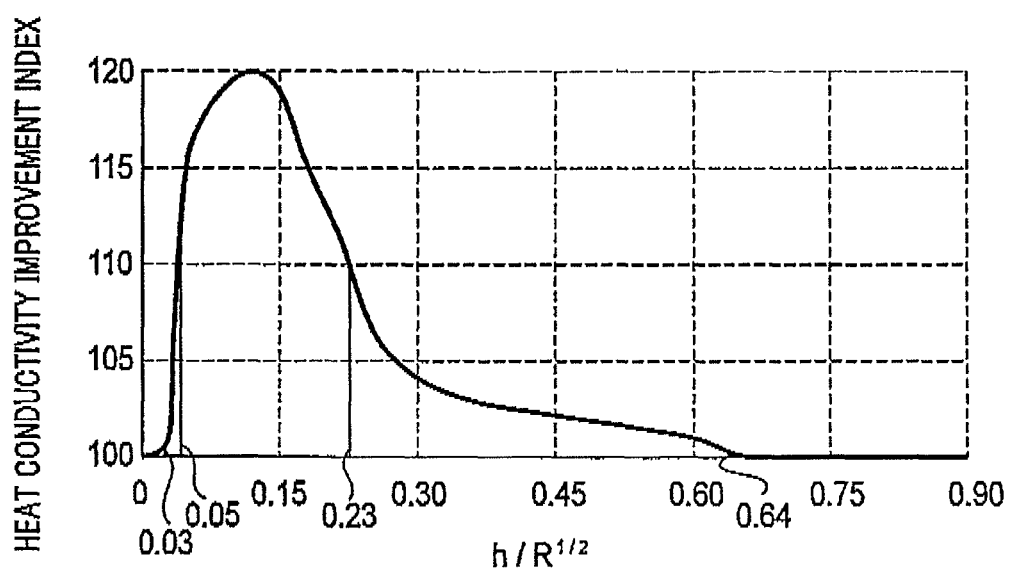
FIG. 26 is a graph showing heat conduction improvement indices corresponding to $h/R^{1/2}$ of the turbulent-flow generating projections in the examples.

From FIG. 26, it is found that durability is enhanced when $h/R^{1/2}$ is set in the range of $0.03 \leq h/R^{1/2} \leq 0.64$. Additionally, from FIG. 26, it is also found that $0.05 \leq h/R^{1/2} \leq 0.64$ is preferable.

In order that a heat releasing effect attributable to the turbulent-flow generating projections 10 may be sufficiently exerted, it is important to have a projection height of the same level as a thickness of a speed boundary layer (a layer having a low speed on a wall face) in each of locations having the turbulent-flow generating projections 10 placed therein, and this causes a sufficient fluid mixing effect to be exerted. Since the thickness of the speed boundary layer is defined by a square root of a tire radius on the assumption of a certain speed, a ratio of the projection height thereto can be used as an index for the heat releasing effect.

INDUSTRIAL APPLICABILITY

As has been described above, the pneumatic tire according to the present invention can decrease a tire temperature, particularly a temperature in the tire side portion, through efficient heat releasing, and can enhance durability, and therefore, is beneficial in pneumatic tire manufacturing technologies and the like.

The invention claimed is:

1. A pneumatic tire in which turbulent-flow generating projections each extending from an inner circumference side to an outer circumference side, and provided on an outer tire surface at intervals in a tire circumferential direction, wherein:
    each of the turbulent-flow generating projections includes an edge portion when being viewed in a cross-sectional shape taken along a direction perpendicular to an extending direction thereof; and
    a front wall angle formed between a front wall face of each turbulent-flow generating projection and the tire surface is set in the range of 70° to 110°, the front wall face being hit by an airflow,
    wherein the turbulent-flow generating projections are provided in a tire side portion,
    wherein relationships of $8.0 \leq p/h \leq 50.0$ and $10.0 \leq (p-w)/w \leq 50.0$ are satisfied where: h denotes the height of each of the turbulent-flow generating projections; p denotes a pitch of adjacent ones of the turbulent-flow generating projections in a tire rotation direction; and w denotes a lower side width of each of the turbulent-flow generating projections in the cross-sectional shape,
    wherein the turbulent-flow generating projections are provided at regular intervals in the tire circumferential direction,
    wherein the pneumatic tire is a heavy-duty tire specified by the standards determined by The Tire and Rim Association, Inc. Year Book in the United States of America.

2. The pneumatic tire according to claim 1, wherein the cross-sectional shape of each turbulent-flow generating projection is left-right symmetric.

3. The pneumatic tire according to claim 1, wherein a rear wall angle formed between a rear wall face and the tire surface is set to 90° or more, the rear wall face being located in the rear of the front wall face with respect to a tire rotation direction.

4. The pneumatic tire according to claim 1, wherein a lower side width of the cross-sectional shape of the turbulent-flow generating projection is set in the range of 0.5 mm to 5 mm.

5. The pneumatic tire according to claim 1, wherein a relationship of $0.03 \leq h/R^{1/2} \leq 0.64$ is satisfied where: h denotes a height of the turbulent-flow generating projection; and R, a tire radius.

6. The pneumatic tire according to claim 5, wherein a relationship of $0.05 \, h/R^{1/2} \leq 0.64$ is satisfied where: h denotes a height of the turbulent-flow generating projection; and R, a tire radius.

7. The pneumatic tire according to claim 5, wherein the cross-sectional shape of the turbulent-flow generating projection is trapezoidal.

8. The pneumatic tire according to claim 1, wherein a through-hole is formed in the turbulent-flow generating projection, the through-hole penetrating in a direction perpendicular to the extending direction.

9. The pneumatic tire according to claim 1, wherein a tilt angle θ is set in the range of $-70° \leq θ \leq 70°$, the tilt angle θ being an angle at which the turbulent-flow generating projection tilts to a tire radial direction.

10. The pneumatic tire according to claim 1, wherein a sidewall reinforcing layer which reinforces the tire side portion is provided in the tire side portion.

11. The pneumatic tire according to claim 1 further comprising a carcass layer inclining at a 90 degree angle with respect to the tire circumferential direction.

12. The pneumatic tire according to claim 1, wherein the edge portion is formed on the front wall face and an upper face.

13. A pneumatic tire in which turbulent-flow generating projections each extending from an inner circumference side to an outer circumference side, and provided on an outer tire surface at intervals in a tire circumferential direction, wherein:
    each of the turbulent-flow generating projections includes an edge portion when being viewed in a cross-sectional shape taken along a direction perpendicular to an extending direction thereof; and
    a front wall angle formed between a front wall face of each turbulent-flow generating projection and the tire surface is set in the range of 70° to 110°, the front wall face being hit by an airflow,
    wherein the turbulent-flow generating projections are provided in a tire side portion,
    wherein relationships of $8.0 \leq p/h \leq 50.0$ and $10.0 \leq (p-w)/w \leq 50.0$ are satisfied where: h denotes the height of each of the turbulent-flow generating projections; p denotes a pitch of adjacent ones of the turbulent-flow generating projections in a tire rotation direction; and w denotes a lower side width of each of the turbulent-flow generating projections in the cross-sectional shape,
    wherein the turbulent-flow generating projections are provided at regular intervals in the tire circumferential direction,
    wherein a relationship of $10.0 \leq (p-w)/w \leq 25.0$ is satisfied where: p denotes a pitch of adjacent ones of the air turbulent-flow generating projections in a tire rotation direction; and w denotes a lower side width of each of the air turbulent-flow generating projections in the cross-sectional shape.

14. A pneumatic tire in which turbulent-flow generating projections each extending from an inner circumference side to an outer circumference side, and provided on an outer tire surface at intervals in a tire circumferential direction, wherein:
    each of the turbulent-flow generating projections includes an edge portion when being viewed in a cross-sectional shape taken along a direction perpendicular to an extending direction thereof; and
    a front wall angle formed between a front wall face of each turbulent-flow generating projection and the tire surface is set in the range of 70° to 110°, the front wall face being hit by an airflow,
    wherein the turbulent-flow generating projections are provided in a tire side portion,
    wherein relationships of $8.0 \leq p/h \leq 50.0$ and $10.0 \leq (p-w)/w \leq 50.0$ are satisfied where: h denotes the height of each of the turbulent-flow generating projections; p denotes a pitch of adjacent ones of the turbulent-flow generating projections in a tire rotation direction; and w denotes a lower side width of each of the turbulent-flow generating projections in the cross-sectional shape,
    wherein the turbulent-flow generating projections are provided at regular intervals in the tire circumferential direction,
    wherein a relationships of $8.0 \leq p/h \leq 14.0$ is satisfied where: h denotes a height of each of the air turbulent-flow generating projections and p denotes a pitch of adjacent ones of the air turbulent-flow generating projections in a tire rotation direction.

\* \* \* \* \*